(12) United States Patent
Cosley et al.

(10) Patent No.: US 8,902,570 B2
(45) Date of Patent: Dec. 2, 2014

(54) PANELBOARD ENCLOSURE WITH IMPROVED EXTERNAL POWER CUTOFF SWITCH

(75) Inventors: Michael R. Cosley, Crystal Lake, IL (US); Alan Amoroso, Buffalo, NY (US); Aron J. King, Alden, NY (US)

(73) Assignee: Diversified Control, Inc., Orchard Park, NY (US)

( * ) Notice: Subject to any disclaimer, the term of this patent is extended or adjusted under 35 U.S.C. 154(b) by 446 days.

(21) Appl. No.: 12/977,889

(22) Filed: Dec. 23, 2010

(65) Prior Publication Data

US 2012/0162862 A1    Jun. 28, 2012

(51) Int. Cl.
| | |
|---|---|
| H02B 11/133 | (2006.01) |
| H05K 5/02 | (2006.01) |
| H05K 5/03 | (2006.01) |
| H01H 9/20 | (2006.01) |
| H02B 1/42 | (2006.01) |

(52) U.S. Cl.
CPC ........................................ *H02B 1/42* (2013.01)
USPC ........... 361/632; 361/631; 361/634; 361/635; 361/643; 361/616; 200/50.32; 200/50.33; 200/50.4

(58) Field of Classification Search
USPC ......... 361/631, 632, 634, 635, 643, 644, 616; 200/50.32, 50.33, 50.4
See application file for complete search history.

(56) References Cited

U.S. PATENT DOCUMENTS

| | | | |
|---|---|---|---|
| 3,778,633 A | 12/1973 | DeVisser et al. | |
| 4,270,031 A | 5/1981 | Borona et al. | |
| 5,136,463 A | 8/1992 | Webster | |
| 5,202,538 A * | 4/1993 | Skirpan | 174/661 |
| 5,286,935 A * | 2/1994 | Mina et al. | 200/330 |
| 5,393,942 A | 2/1995 | Reiner et al. | |
| 5,577,603 A | 11/1996 | Bogdanovs et al. | |
| 5,634,553 A * | 6/1997 | Hopper et al. | 200/336 |
| 5,648,646 A | 7/1997 | Flegel | |
| 5,663,862 A * | 9/1997 | Hopping-Mills | 361/115 |
| 5,670,936 A | 9/1997 | Estes et al. | |

(Continued)

FOREIGN PATENT DOCUMENTS

CN    2579049    10/2003

OTHER PUBLICATIONS

Electric Equipment & Engineering Co., "200A, 120/240V, 1 Phase TSM With TWS Surge Protection and GFI in 3R Cabinet", Apr. 6, 2009, 1 page.

(Continued)

*Primary Examiner* — Anatoly Vortman
(74) *Attorney, Agent, or Firm* — Walter W. Duft

(57) ABSTRACT

An electrical panelboard enclosure includes an enclosure housing with an interior equipment chamber accessible by way of a service entrance door. A service panel is configured to receive power from a main power source. A main power breaker has a main power breaker toggle switch and is positionable between a power-on state and a power-off state to selectively activate and deactivate the main power. A power cutoff switch mechanism is operable from outside the service entrance door and is positionable between a power-on state and a power-off state to mechanically engage and deactivate the main power breaker toggle switch and cutoff the main power without opening the service entrance door. A lockout system is operable to prevent the service entrance door from being secured in a closed position unless the main power breaker and the power cutoff switch mechanism are in the same state.

17 Claims, 26 Drawing Sheets

(56) References Cited

U.S. PATENT DOCUMENTS

| | | | |
|---|---|---|---|
| 5,781,410 A | 7/1998 | Keown et al. | |
| 5,861,591 A * | 1/1999 | Wegener et al. | 200/50.32 |
| 5,963,420 A | 10/1999 | Bailey et al. | |
| 5,977,492 A | 11/1999 | Taylor et al. | |
| 5,982,652 A | 11/1999 | Simonelli et al. | |
| 6,031,193 A | 2/2000 | Flegel | |
| 6,069,328 A | 5/2000 | Oravetz | |
| 6,184,595 B1 | 2/2001 | Flegel, Jr. | |
| 6,521,849 B1 | 2/2003 | Flegel | |
| 6,534,735 B1 | 3/2003 | Czarnecki | |
| 6,541,718 B2 | 4/2003 | Burkholder et al. | |
| 6,570,269 B2 | 5/2003 | McMillan et al. | |
| 6,621,689 B1 | 9/2003 | Flegel | |
| 6,784,385 B2 | 8/2004 | Hernandez-Perez | |
| 6,927,349 B1 | 8/2005 | Flegel et al. | |
| 6,932,443 B1 | 8/2005 | Kaplan et al. | |
| 6,980,725 B1 | 12/2005 | Swieconek | |
| 7,142,950 B2 | 11/2006 | Rasmussen et al. | |
| 7,238,898 B1 * | 7/2007 | Czarnecki | 200/50.32 |
| 7,239,045 B2 | 7/2007 | Lathrop et al. | |
| 7,259,481 B2 | 8/2007 | Eaton et al. | |
| 7,268,308 B1 * | 9/2007 | Caudill et al. | 200/50.35 |
| 7,339,353 B1 | 3/2008 | Masias et al. | |
| 7,402,766 B1 * | 7/2008 | Jonas et al. | 200/50.33 |
| 7,418,314 B2 | 8/2008 | Rasmussen et al. | |
| 7,446,270 B2 * | 11/2008 | Somalingayya et al. | 200/50.32 |
| 7,462,791 B1 * | 12/2008 | Flegel | 200/50.32 |
| 7,514,815 B2 | 4/2009 | Paik et al. | |
| 7,531,762 B2 * | 5/2009 | Flegel | 200/50.32 |
| 7,599,171 B1 | 10/2009 | Remmert | |
| 7,616,432 B2 | 11/2009 | Luebke et al. | |
| 7,772,510 B2 * | 8/2010 | Manahan et al. | 200/50.02 |
| 7,800,512 B1 * | 9/2010 | Czarnecki | 340/693.1 |
| 7,816,602 B2 | 10/2010 | Landry et al. | |
| 7,834,486 B1 * | 11/2010 | Flegel et al. | 307/126 |
| 7,855,871 B2 | 12/2010 | Hudgins et al. | |
| 7,864,509 B1 | 1/2011 | Remmert | |
| 7,952,039 B2 * | 5/2011 | Manahan et al. | 200/50.02 |
| 8,040,663 B1 * | 10/2011 | Czarnecki | 361/632 |
| 8,138,433 B2 * | 3/2012 | Czarnecki et al. | 200/50.32 |
| 8,254,089 B2 | 8/2012 | Cosley et al. | |
| 2002/0125115 A1 | 9/2002 | Burkholder et al. | |
| 2006/0158037 A1 | 7/2006 | Danley et al. | |
| 2006/0202559 A1 | 9/2006 | Hashimoto et al. | |
| 2007/0056835 A1 * | 3/2007 | Manahan et al. | 200/50.02 |
| 2007/0278071 A1 * | 12/2007 | Flegel | 200/50.33 |
| 2008/0190747 A1 * | 8/2008 | Carson et al. | 200/50.1 |
| 2009/0073641 A1 | 3/2009 | Ross | |
| 2010/0038966 A1 * | 2/2010 | Espeut, Jr. | 307/68 |
| 2010/0290604 A1 | 11/2010 | Wright et al. | |
| 2011/0310533 A1 | 12/2011 | Cosley et al. | |
| 2011/0310534 A1 * | 12/2011 | Cosley et al. | 361/632 |

OTHER PUBLICATIONS

AC Data Solutions, "ILC Series Integrated Load Center Solutions", Feb. 20, 2007, 2 pages.
Emerson Network Power, "JuiceBox Power Transfer Switch (PTS)", Jan. 1, 2006, pp. 1-6.
Pantrol, "Innovattive Power Solutions", Jan. 1, 2009, 22 pages.
Gentran Corporation, "Power Centers", May 21, 2008, 2 pages.
Square D, "Class 9421, Type FP-1 Door Mounted Operating Mechanism for Use With Square D Type KA Circuit Breaker", Apr. 1, 1983, 1 page.
Square D, "Class 9421 Type L Door Mounted Operating Mechanisms for use with Square D Type KAL, KCL and KHL Circuit Breakers", Jan. 1, 1994, 8 pages.
Thomson Technology, "Automatic Transfer Switches", Aug. 5, 2001, 4 pages.
AC Data Solutions, "Power Protection Cabinet (PPC)", Jul. 2, 2007, 2 pages.
AC Data Solutions, "Panel One Series ILC Integrated Load Center Solutions", Feb. 29, 2007, 2 pages.
AC Data Solutions, "GenLox Alternate Power Connection Integrated Load Center & Shelter Solutions", Jun. 23, 2008, 2 pages.
Electric Equipment & Engineering Co., "Panel One Integrated Load Center", Feb. 29, 2007, 21 pages.
Square D, "Operating Mechanisms, Disconnect Switches, and Door-Closing Mechanisms Selection Guide", Dec. 1, 1997, 44 pages.
Siemens, "General Duty 240 Volt, Type 1 (Indoor)", Jan. 1, 2002, 1 page.
Siemens, "Siemens Enclosed Rotary Disconnect Switches", Jan. 1, 2002, 2 pages.
Siemens, "Visible Blade Disconnect Switches", Jan. 1, 2008, 12 pages.
Cutler-Hammer, "Safety Switches", Jan. 1, 1999, 12 pages.
Ferraz Shawmut, "Enclosed Disconnect Switches", Jan. 1, 2007, 8 pages.
GE Industrial Systems, "IEC Disconnect Switches Selection Guide", Feb. 2, 2000, 6 pages.
Klockner Moeller, "Molded Case Circuit Breakers and Switches", Jan. 1, 2007, 2 pages.
Klockner Moeller, "Molded Case Circuit Breakers and Switches, 600 A, 600 V AC", Jan. 1, 2005, 2 pages.
Klockner Moeller, "Product Range Catalog | 2006 Switching, protection, communication—the new NZM-4 circuit-breaker series up to 1200 A", Aug. 1, 2006, 176 pages.
Aron J. King, "Declaration of Aron J. King Under 37 C.F.R. 1.56", Mar. 22, 2012, 26 pages.
CIPO, First Canadian Examination Report in Counterpart Application, Canadian Application No. 2,731,584 for "Panelboard Enclosure With Improved External Power Cutoff Switch", Jul. 20, 2012, 2 pages.
CIPO, Second Canadian Examination Report in Counterpart Application, Canadian Application No. 2,731,584 for "Panelboard Enclosure With Improved External Power Cutoff Switch", Mar. 19, 2013, 2 pages.

* cited by examiner

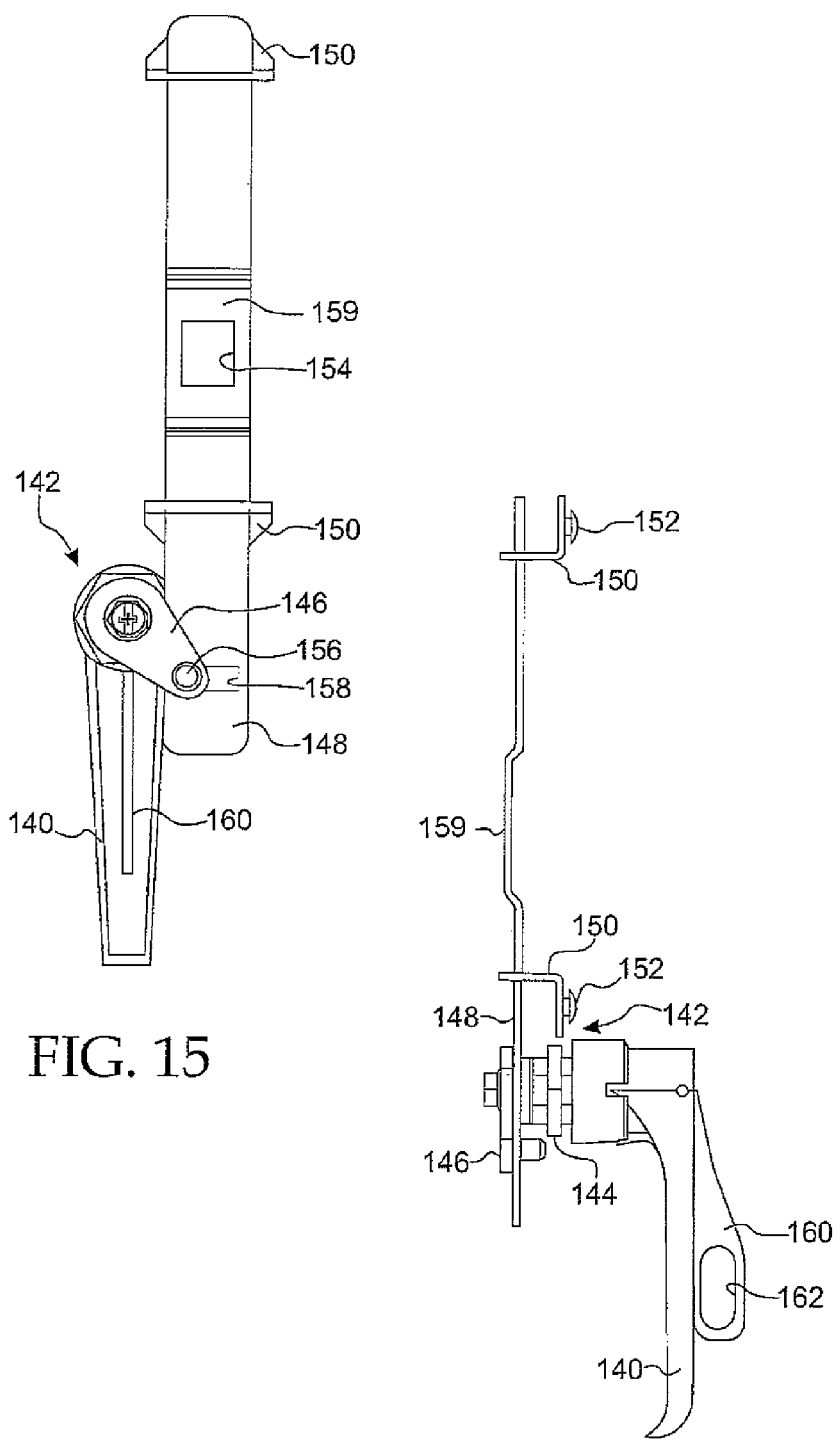

PANELBOARD ENCLOSURE WITH IMPROVED EXTERNAL POWER CUTOFF SWITCH

CROSS-REFERENCE TO RELATED APPLICATIONS

This application relates to U.S. patent application Ser. No. 12/817,594 filed on Jun. 17, 2010 and entitled "Panelboard Enclosure With External Power Cutoff Switch."

BACKGROUND

1. Field of the Invention

The present invention relates to electrical panelboard enclosures, including but not limited to panelboard enclosures with power transfer switch functionality for alternate power source connection.

2. Description of the Prior Art

By way of background, electrical panelboard enclosures (also referred to as distribution boards, service panels, breaker panels, etc.) are used to distribute electrical power from a main power source to one or more subsidiary load circuits. Some panelboard enclosures provide the ability to selectively power the subsidiary circuits from the main power source, such as a utility power grid, and an alternate power source, such as a backup generator. This is known as power transfer switching. It is to improvements in electrical panelboard enclosures, and particularly panelboard enclosures equipped with power transfer switching capability, that the present invention is directed.

SUMMARY

An electrical panelboard enclosure includes an enclosure housing with an interior equipment chamber accessible by way of a service entrance door. A service panel is configured to receive power from a main power source. A main power breaker has a main power breaker toggle switch and is positionable between a power-on state and a power-off state to selectively activate and deactivate the main power. A power cutoff switch mechanism is operable from outside the service entrance door and is positionable between a power-on state and a power-off state to mechanically engage and deactivate the main power breaker toggle switch and cutoff the main power without opening the service entrance door. A lockout system is operable to prevent the service entrance door from being secured in a closed position unless the main power breaker and the power cutoff switch mechanism are in the same state.

According to a example embodiments, the lockout system may comprise a first lockout component associated with the power cutoff switch mechanism and a second lockout component associated with the main power breaker. The first lockout component and the second lockout component are configured for nested engagement with each other when the main power breaker and the power cutoff switch mechanism are in the same state, and are configured for non-nested engagement with each other when the main power breaker and the power cutoff switch mechanism are not in the same state. One of the lockout components may comprises a protrusion and the other may comprises a recess. The protrusion engages the recess when the lockout components are in nested engagement, but not when the lockout components are in non-nested engagement. The first lockout component may be a component of the power cutoff switch mechanism that is movably mounted on an inside of the service entrance door.

The second lockout component may be a component of the main power breaker that is movably mounted to actuate the main power breaker toggle switch.

According to a particular example embodiment, the first lockout component may comprise a slidable switch bar that forms part of the power cutoff switch mechanism. The switch bar carries a cross bar that provides a lockout component protrusion. The second lockout component may comprise a slidable main breaker position indicator. The main breaker position indicator is formed as a channel having a pair of rigid sidewalls with mutually aligned notches that provide a lockout component recess. The cross bar of the power cutoff mechanism's switch bar engages the notches of the main breaker position indicator when the lockout components are in nested engagement. The cross bar engages the rigid sidewalls of the main breaker position indicator when the lockout components are in non-nested engagement.

According to another particular example embodiment, the first lockout component may again comprise a slidable switch bar that forms part of a power cutoff switch mechanism. The switch bar is formed with one or more apertures that provide a lockout component recess. The second lockout component may comprise a slidable main breaker position indicator formed with one or more flanges that engage the one or more switch bar apertures. The one or more flanges of the main breaker position indicator engage the one or more apertures when the lockout components are in nested engagement. The one or more flanges of the main breaker position indicator engage a body portion of the switch bar when the lockout components are in non-nested engagement.

BRIEF DESCRIPTION OF THE DRAWINGS

The foregoing and other features and advantages of the invention will be apparent from the following more particular description of example embodiments, as illustrated in the accompanying Drawings, in which:

FIG. 15 is a rear elevation view showing the power cutoff switch mechanism of FIG. 14;

FIG. 16 is a side elevation view showing the power cutoff switch mechanism of FIG. 14;

DETAILED DESCRIPTION OF EXAMPLE EMBODIMENTS

Figure 1:
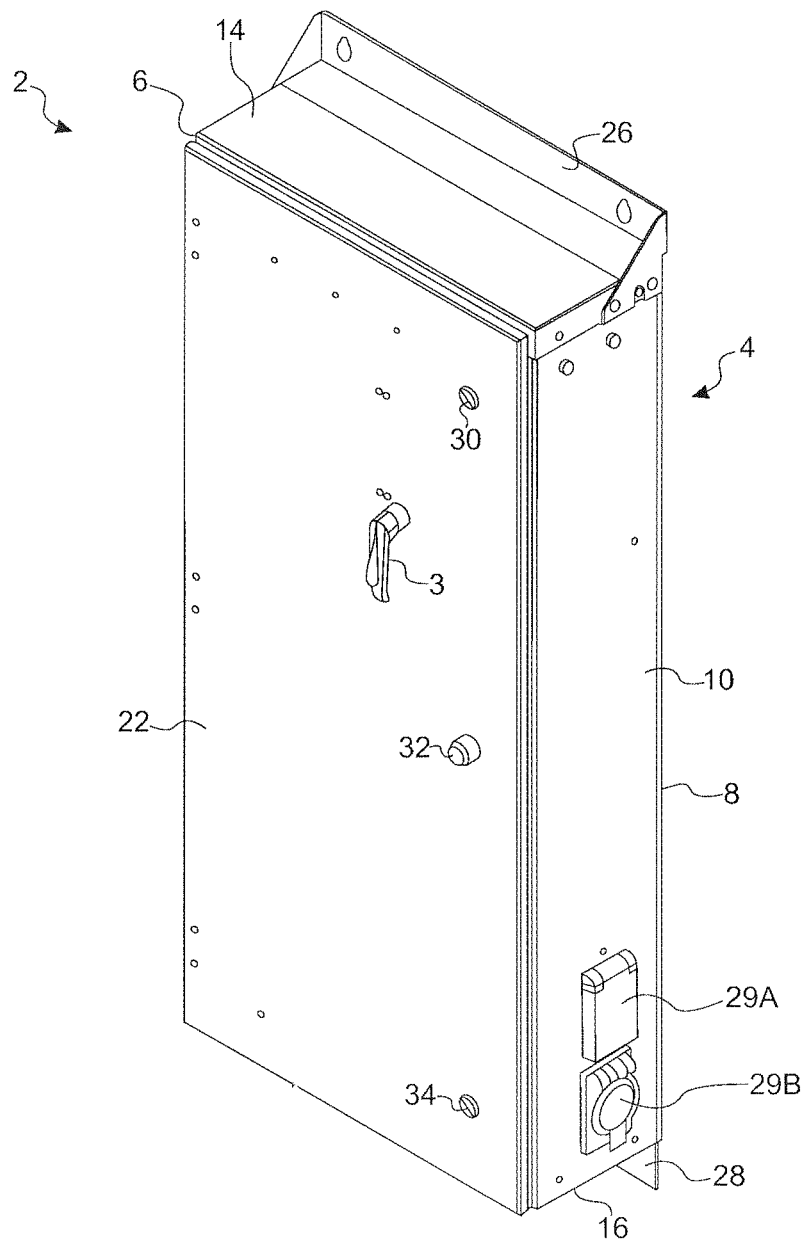
FIG. 1 is a perspective view showing an example panelboard enclosure according to the present disclosure.

Turning now to the drawing figures, wherein like reference numerals are used to represent like elements in all of the several views, FIG. 1 illustrates an embodiment of a panelboard enclosure 2 (also referred to herein as a panelboard), that may be constructed in accordance with the present disclosure. As described in more detail below, the panelboard 2 is operative to selectively distribute main power (e.g., from a utility power source or the like) or alternate power (e.g., from a backup generator or the like) to plural subsidiary load circuits. The panelboard 2 may be used in many different applications, but is particularly suited for outdoor use at an electrical equipment site, such as a cellular telephone tower or other location. Among the features that may be provided by the panelboard 2 are a power cutoff switch mechanism 3 operable from outside the panelboard to allow fire crews or other emergency personnel to disconnect main utility power without having to enter the enclosure. Another feature is the ability to use a pre-fabricated assembly that allows most of the internal components of the panelboard 2 to be installed as a single unit when constructing or servicing the enclosure.

Figure 1A:
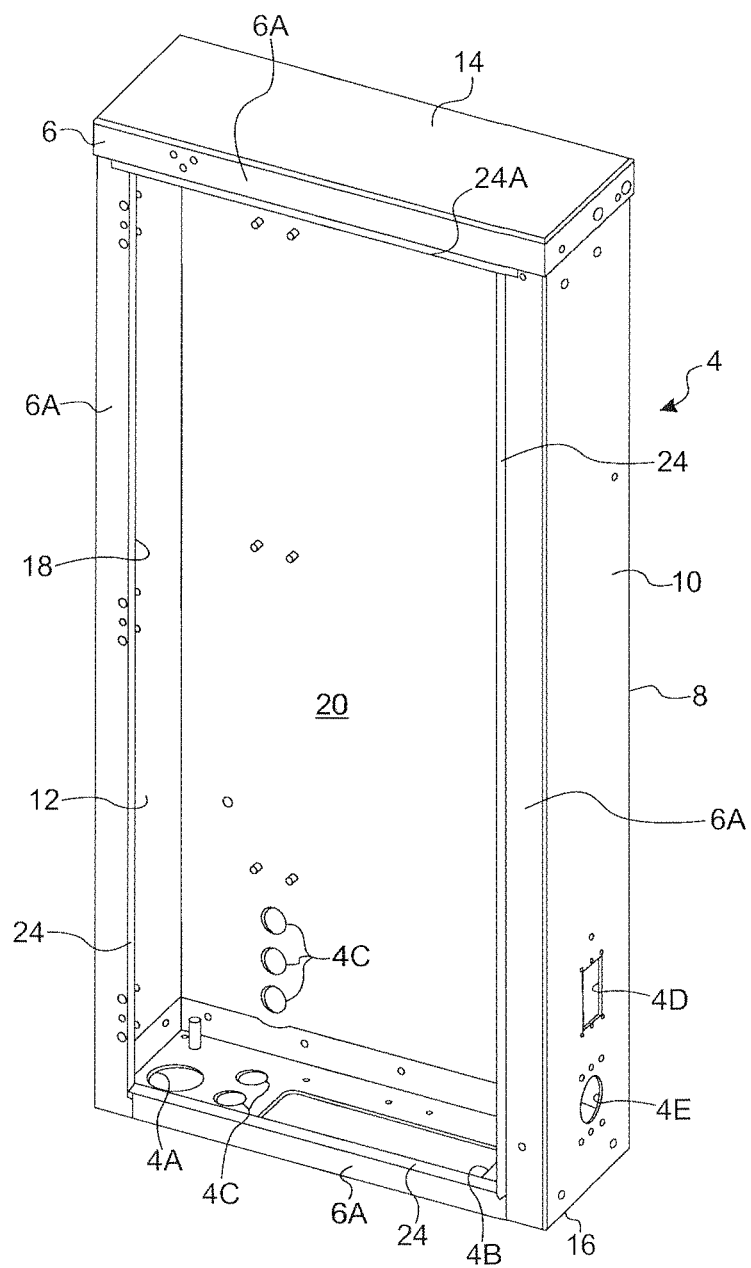
FIG. 1A is a perspective view showing an enclosure housing of the panelboard enclosure of FIG. 1.

With additional reference now to FIG. 1A, the panelboard 2 is constructed with a main enclosure housing 4 that provides a barrier against access to the panelboard's power control components (e.g., service switches and circuit breakers). The enclosure housing 4 is generally box-shaped and is formed with a front 6, a back 8, a right side 10, a left side 12, a top 14 and a bottom 16. Other enclosure shapes may also be used. The front 6 is provided with a bezel frame 6A that defines a large opening 18. The opening 18 allows access to an interior equipment chamber 20 within the enclosure housing 4.

Figure 2:
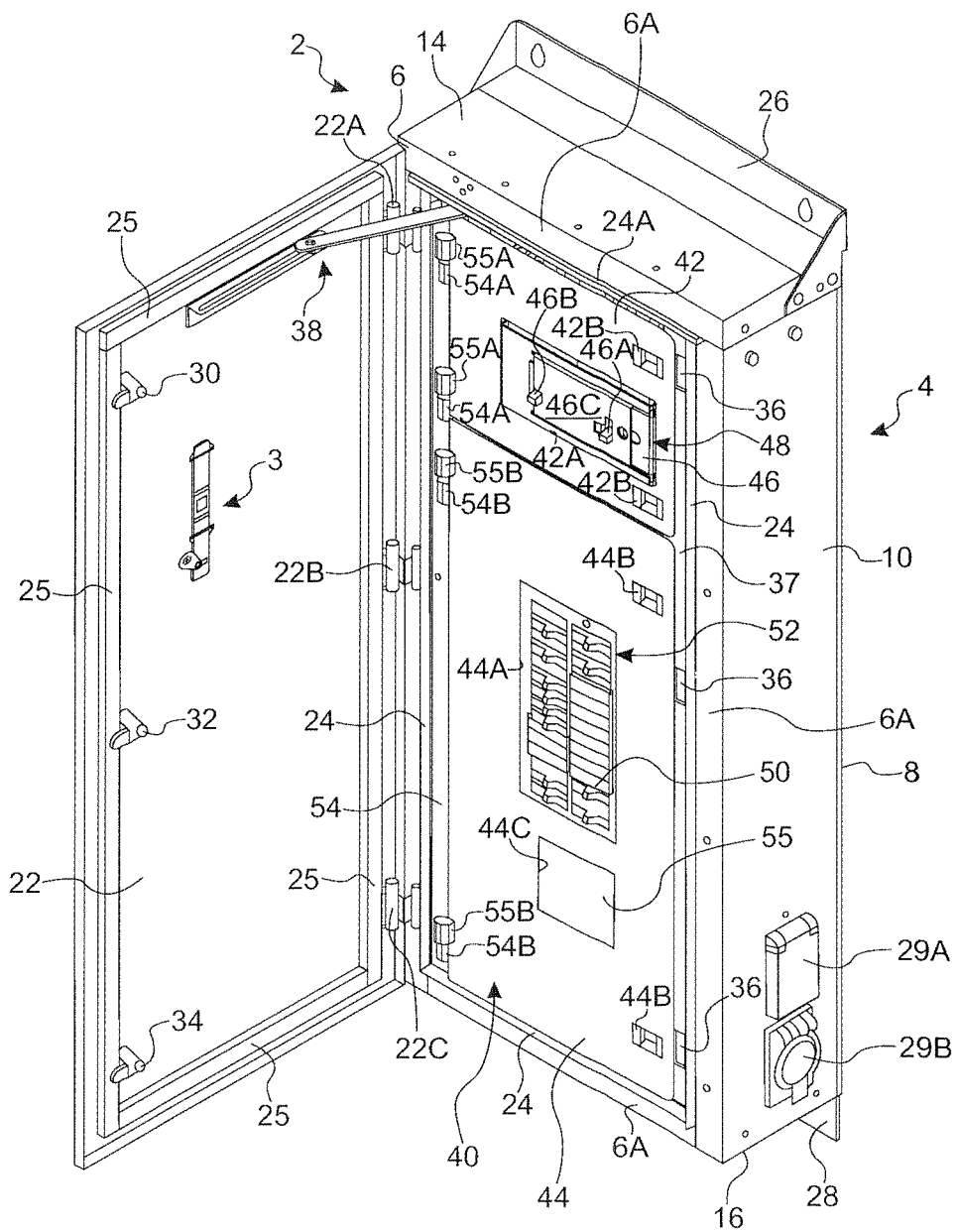
FIG. 2 is a perspective view showing the panelboard enclosure of FIG. 1 with a service entrance door in an open position.

With additional reference now to FIG. 2, a service entrance door 22 is pivotally mounted on the enclosure housing 4 using hinges 22A, 22B and 22C. The service entrance door 22 is positionable between a closed position wherein the front opening 18 is covered (see FIG. 1) and an open position wherein the front opening is exposed (see FIG. 2). In order to help seal the equipment chamber 20 from the elements, the bezel frame 6A may be formed with a peripheral lip 24, an upper horizontal portion of which is shaped to provide a drip gutter 24A. As can be seen in FIG. 2, the service entrance door 22 may be provided with a peripheral seal 25 made of soft resilient material (e.g., foam weather stripping) that engages the peripheral lip 24 when the door is closed. If desired, optional upper and lower mounting brackets 26 and 28 may be mounted on the enclosure housing 4 to facilitate attaching the panelboard 2 to a mounting structure, such as a poll, a framework, a wall, etc. Alternatively, or in addition, mounting apertures (not shown) may be drilled, cut or otherwise formed in the back 8 of the housing. According to a further mounting scheme, the bottom 16 of the enclosure housing 4 may be seated on a plinth (not shown) that is mounted on a support base (not shown).

As can be seen in FIG. 1A, the bottom 16 of the enclosure housing 4 is formed with a circular aperture 4A for receiving main power source wiring (not shown). The bottom 16 of the enclosure housing 4 is also formed with a generally rectangular opening 4B for receiving alternate power source cables (not shown) that may be detachably connected within the enclosure housing (as described in more detail below). The bottom 16 and the back 8 of the enclosure housing are further formed with a set of circular apertures 4C that receive distribution power wiring (not shown). On the right side 10 of the enclosure housing 4, two apertures 4D and 4E are provided for respectively mounting 120 V and 240V plugs 29A and 29B, as shown in FIGS. 1 and 2. It will be appreciated that the structural components of the enclosure housing 4 can be made from any suitable material that is relatively rigid and strong, including sheet metal (e.g., steel) or a non-metallic material such as plastic or a composite.

The service entrance door 22 can be locked in its closed position using one or more key-activated cam locks. The number of cam locks will typically depend on the size of the enclosure 2 and/or applicable electrical code specifications. Three such cam locks 30, 32 and 34 are shown in FIGS. 1 and 2. The cam locks 30, 32 and 34 may be formed with a security lock pattern (such as an undulating groove) that requires a corresponding security key. As can be seen in FIG. 2, the cam locks 30, 32 and 34 engage keeper openings 36 formed in a keeper plate 37 mounted to the right-hand vertical member of the front bezel frame 6A. If desired, nonconductive backing cups (not shown) may be mounted on the inside of the keeper openings 36 to isolate the cam locks 30, 32 and 34 from any live conductors within the equipment chamber 20 that might be in the vicinity. A wind latch mechanism 38 limits pivoting of the service entrance door 22 and allows it to be locked in the open position.

With continuing reference to FIG. 2, the service entrance door 22 opens to reveal a dead front 40. The dead front 40 includes an upper dead front door 42 and a lower dead front door 44. The upper dead front door 42 is formed with a cutout 42A that exposes a service transfer switch unit 46 of a primary service panel 48. The service transfer switch unit 46 includes a main power breaker toggle switch 46A, an alternate power breaker toggle switch 46B, and an interlock mechanism 46C. The lower dead front door 44 is formed with a cutout 44A that exposes a set of distribution breakers 50 of a distribution service panel 52. Both of the dead front doors 42 and 44 are pivotally mounted to a hinge plate 54 that is in turn mounted to the enclosure housing 4 (as described in more detail below). The hinge plate 54 carries upper and lower sets of hinge mounts 54A and 54B to which the dead front doors 42 and 44 are respectively attached. The hinge mounts 54A and 54B can be made from any suitable material, such as an abrasion resistant polymer. The upper and lower dead front doors 42 and 44 each include mating hinge hardware 55A and 55B that couples to the pins of the hinge mounts 54A and 54B. Both of the dead front doors 42 and 44 are also respectively provided with slide latches 42B and 44B that are configured to engage the inside lip of the keeper plate 37. A second cutout 44C on the lower dead front door 44 may be provided in cases where the panelboard 2 includes a transient voltage surge suppressor (TVSS) unit 55, also known as a surge protection device (SPD).

Figure 3:
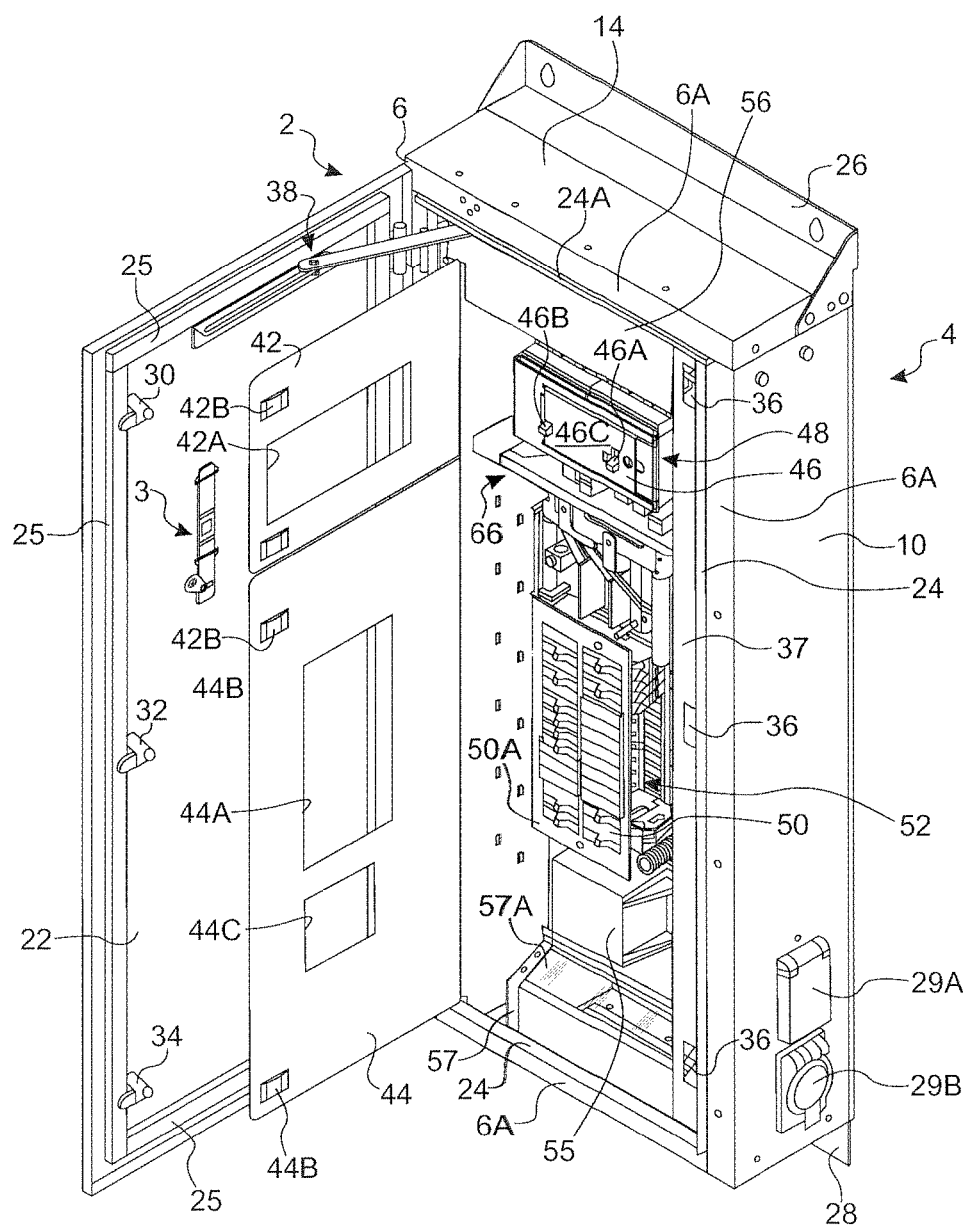
FIG. 3 is a perspective view showing the panelboard enclosure of FIG. 1 with a primary service panel door and a distribution service panel door in an open position.

The upper and lower dead front doors 42 and 44 may be opened as shown in FIG. 3. Opening the upper dead front door 42 reveals more of the service transfer switch unit 46 and the primary service panel 48, but with the upper portion thereof being covered by a primary service panel cover plate 56. The cover plate 56 is detachably mounted to the hinge plate 54 and the keeper plate 37, and serves to cover the hot, neutral and ground electrical connector blocks of the primary service panel 48. The electrical connector blocks and other components of the primary service panel 48 are described in more detail below. Opening the lower dead front door 44 fully reveals the distribution service panel 52 and its distribution breakers 50, as well as the surge suppressor 55. The distribution breakers 50, the surge suppressor and other components of the distribution service panel 52 are also described in more detail below. At the bottom of the enclosure 4, it will also be seen that the lower dead front door 44 covers a connector compartment 57 having a viewing window 57A. As described in more detail below, the connector compartment 57 contains an array of alternate power source connectors (not shown in FIG. 3) that are used to connect a generator or other alternate power source to the enclosure 2. A circuit breaker face plate 50A is also visible when the lower dead front door 44 is open.

Figure 4:
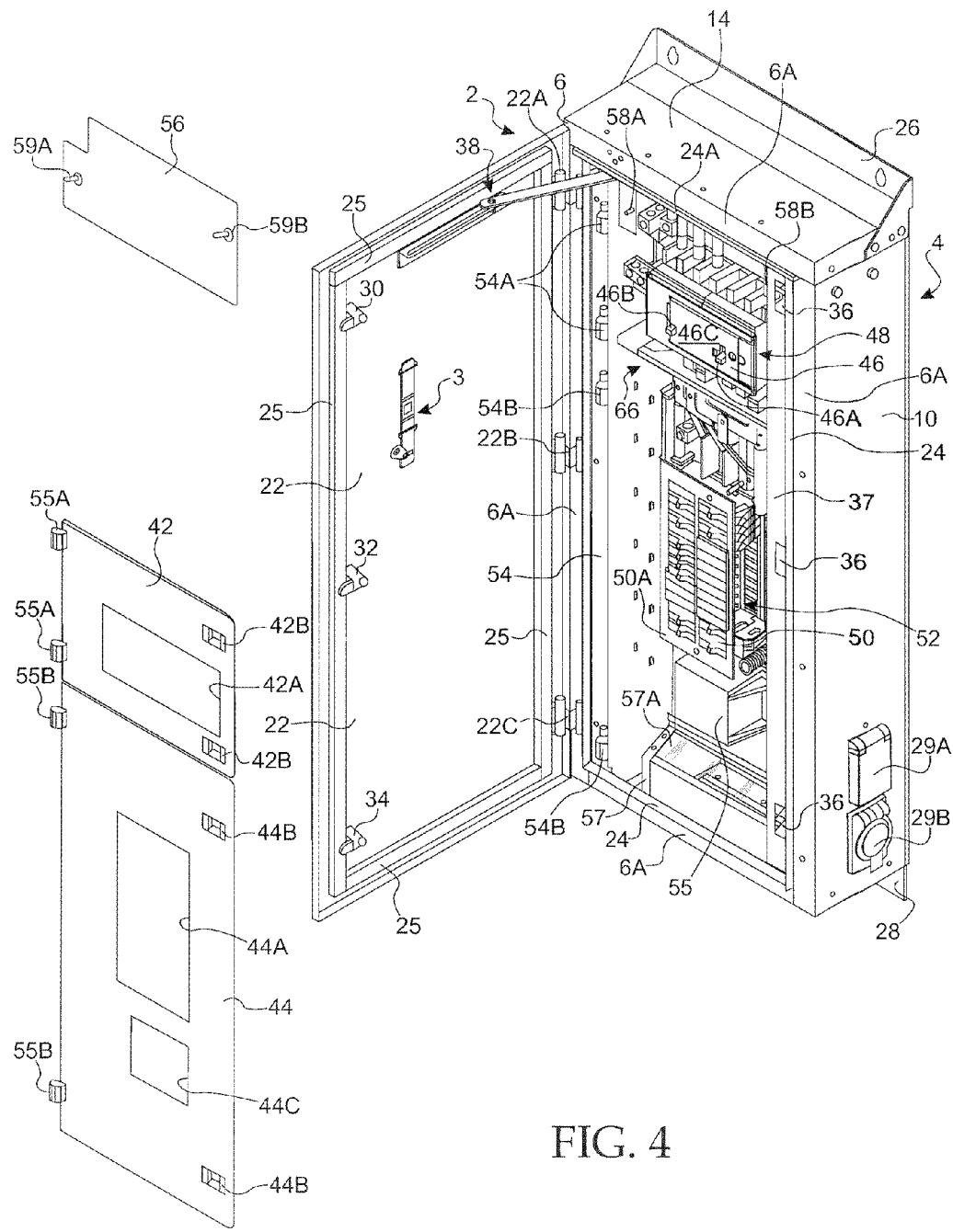
FIG. 4 is an exploded perspective view showing the panelboard enclosure of FIG. 1 after removal of a primary service panel door, a distribution service panel door and a primary service panel cover.

FIG. 4 illustrates that the upper dead front door 42 and the lower dead front door 44 may be detached from the hinge mounts 54A and 54B if necessary during installation or servicing of the panelboard 2. As also shown in FIG. 4, the cover plate 56 may be removed from a pair of cover plate mounting studs 58A and 58B that may be respectively provided on the keeper plate 37 and the hinge plate 54. The cover plate 56 may be secured to the mounting studs using wing nuts 59A and 59B so that tools are not required for the cover plate removal operation.

Figure 5:
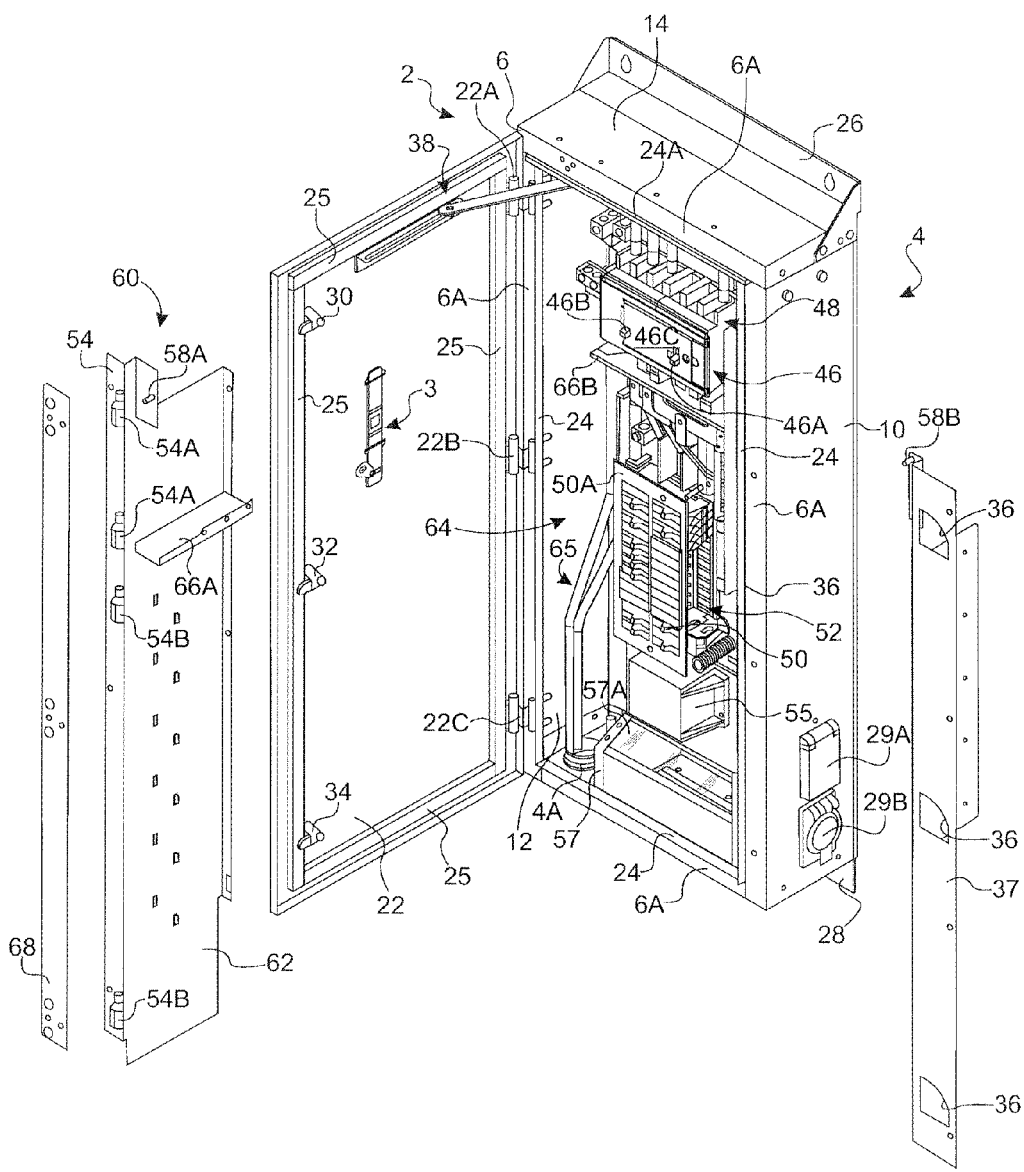
FIG. 5 is an exploded perspective view showing the panelboard enclosure of FIG. 1 after removal of a main power wiring compartment cover and a striker plate.

With additional reference now to FIG. 5, the keeper plate 37 and the hinge plate 54 may be constructed to allow for their detachment from the enclosure housing 4. The hinge plate 54 may be formed as part of a larger frame structure 60 that includes a generally planar cover plate 62. The cover plate 62 extends parallel to the left side 12 of the enclosure housing 4, but is spaced therefrom to provide a main power source wireway 64. The main power source wireway 64 allows main power source wiring 65, which is received through the aperture 4A in the enclosure housing 4, to be routed to the primary service panel 48 within a protective compartment. For ease of illustration, only the neutral and ground wires of the main power source wiring 65 are shown in FIG. 5. The frame structure 60 also includes a barrier stub plate 66A that combines with a barrier stub plate 66B to provide a main barrier plate 66, which is shown in its assembled configuration in FIGS. 3-4. The main barrier plate 66 is disposed between the primary service panel 48 from the distribution service panel 52 and helps isolate the respective electrical components thereof. FIG. 5 further illustrates that the frame structure 60 may be attached to the enclosure housing 4 by way of an intermediate support bracket 68 that is secured to the left-hand bezel frame member 6A.

Figure 6:
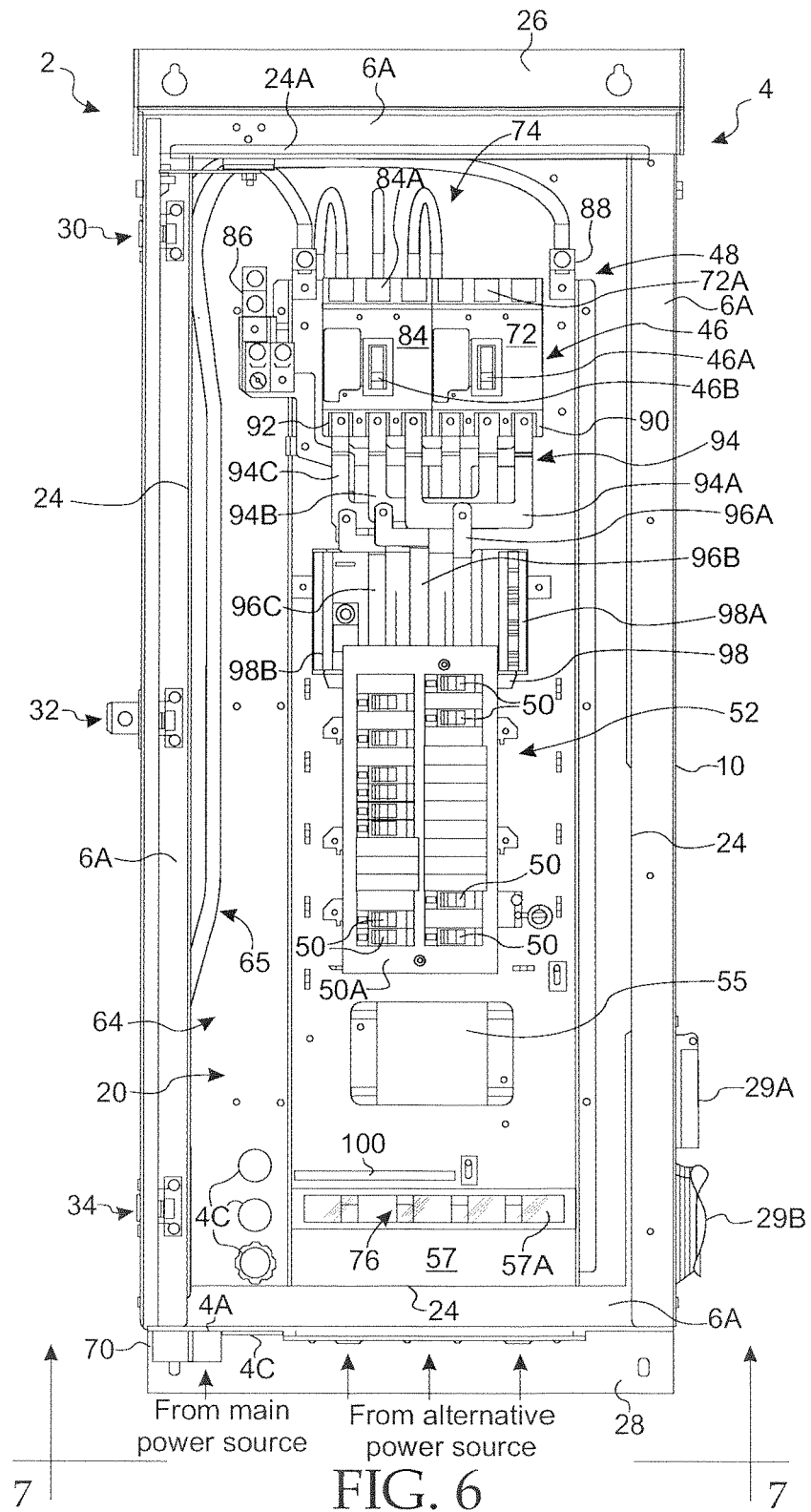
FIG. 6 is a front elevation view showing the panelboard enclosure of FIG. 1 in the disassembly state of FIG. 5.

Turning now to FIG. 6, the electrical components of the panelboard enclosure 2 may now be described in more detail. To provide an unobstructed view of the electrical components, FIG. 6 shows the panelboard 2 in the disassembly state of FIG. 5. In particular, the keeper plate 37, the frame structure 60 and the bracket 68 have been removed. In addition, the interlock mechanism 46C of the power transfer switch unit 46 has also been removed to provide a clearer view of the switch unit's breaker components. Finally, the barrier stub plate 66B has been removed to better illustrate the electrical busses interconnecting the primary service panel 48 and the distribution service panel 52.

As introduced above, the panelboard enclosure 2 includes a primary service panel 48 and a distribution service panel 52, both of which are disposed within the interior equipment chamber 20 of the enclosure housing 4. The primary service panel 48 is configured to receive power from both a main power source (such as a public electrical utility) and an alternate power source (such as a backup generator). Note that FIG. 6 depicts a three-phase embodiment of the panelboard 2. A single phase embodiment may be constructed in substantially the same manner.

Main power is delivered to the primary service panel 48 by way of the main power source wiring 65 described in connection with FIG. 5. Again, for ease of illustration, only the neutral and ground wires of the main power source wiring 65 are shown. The main power source wiring 65 will typically be installed when the panelboard 2 is initially placed in service. The routing path enters the enclosure housing 4 through a cable fitting 70 mounted in the aperture 4A. The routing path then proceeds upwardly through the wireway 64 to the top of the enclosure housing 4, then bends approximately 180 degrees for the final leg to the service transfer switch unit 48. The main power source wiring 65 connects to a main power breaker 72 of the service transfer switch unit 48. The main power breaker 72 includes a main power breaker connector block 72A. Note that the main power breaker 72 also includes the main breaker toggle switch 46A mentioned above in connection with FIG. 3. The main power breaker toggle switch 46A comprises the toggle portion of the main power breaker 72. This toggle portion represents a main power breaker toggle.

Alternate power is delivered to the primary service panel 48 by way of alternate power source wiring 74 that is routed from an alternate power source connector array 76 situated in the connector compartment 57 mentioned above in connection with FIG. 3. For ease of illustration, only the three hot wires of the alternate power source wiring are shown in FIG. 6, with the neutral and ground wires being omitted. Unlike the main power source wiring 65, the alternate power source wiring 74 will typically be preinstalled in the enclosure housing 4 when the panelboard 2 is manufactured and prior to placing it in service.

Figure 7A:
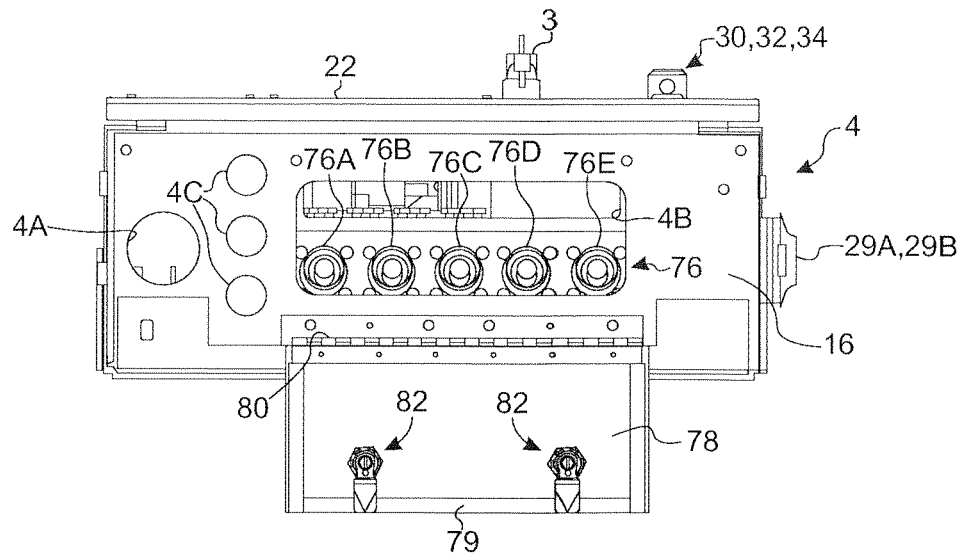
FIG. 7A is a bottom plan view showing an access opening for accessing an alternate power source connector array of the panelboard enclosure of FIG. 1.

FIG. 7A shows the connector array 76 in more detail according to an example three-phase power embodiment. In this embodiment, each connector 76A-76E is implemented as a cylindrical male connector plug of conventional design. Each connector 76A-76E faces downwardly (to facilitate moisture dissipation) and is configured to connect to a corresponding plug receptacle (not shown) mounted on the end of a generator cable or other alternate power feed line. Many other connector designs could also be used. The connector array 76 is accessed from the bottom 16 of the enclosure housing through the elongated aperture 4B discussed above in connection with FIG. 1A.

Because FIG. 7A illustrates a three-phase embodiment, there are five connectors 76, namely a ground connector 76A, a neutral connector 76B and three hot connectors 76C, 76D and 76E. As described below in connection with FIG. 8A, these connectors will respectively connect to alternate power source wires 74A, 74B, 74C, 74D and 74E of the alternate power source wiring 74. In a single-phase implementation, the connectors 76 would be similar except that only two hot connectors 76C and 76D would be required. As described below in connection with FIG. 8B, these connectors will respectively connect to alternate power source wires 74A, 74B, 74C and 74D of the alternate power source wiring 74. Advantageously, alternate power source cables can be attached individually to the corresponding connectors 76A-76E. Special multi-plug connectors are not required.

Figure 7B:
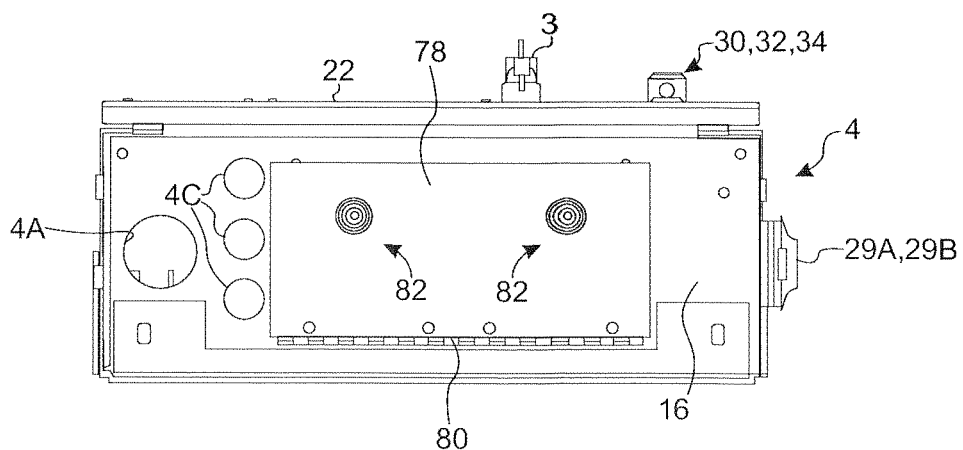
FIG. 7B is a bottom plan view showing the access opening of FIG. 7A following closure thereof.

The alternate power source connector array 76 is accessible from outside the enclosure housing 2 through a connector compartment access door 78. As additionally shown in FIG. 7B, the access door 78 may be mounted to the enclosure housing bottom 16 by way of a piano hinge 80. Other mounting arrangements could also be used. A pair of cam locks 82 may be provided for latching the access door 78 to the enclosure housing bottom 16. Like the cam locks 30, 32 and 34 on the service entry door 22, the cam locks 82 may be designed to require a security key (not shown) in order to unlatch the access door 78 and gain access to the connector array 76. As shown in FIG. 7A, a resilient foam seal 79 (or other sealing member) may be provided around the periphery of the inside surface of the service entry door 22 in order to help seal the connector compartment 57 from the outside environment.

Returning now to FIG. 6, the alternate power source wiring 74 extends from the connector array 76 to an alternate power breaker 84 in the primary service panel 48. The alternate power breaker 84 includes an alternate power breaker connector block 84A to which the alternate power source wiring 74 is connected. Note that the alternate power breaker 84 also includes the alternate breaker toggle switch 46B mentioned above in connection with FIG. 3. The alternate power breaker toggle switch 46B comprises the toggle portion of the alternate power breaker 84. This toggle portion represents an alternate power breaker toggle.

The primary service panel 48 further includes a neutral connector block 86 and a ground connector block 88. In addition, the main power breaker 72 and the alternate power breaker 84 include bus connector blocks 90 and 92 for mounting a network of bus bars 94 that carry power toward the distribution service panel 52. The bus bar network 94/96 includes a set of upper bus bars 94A, 94B and 94C that interconnect the main power breaker 72 and the alternate power breaker 84. The upper bus bars 94A, 94B and 94C carry power out of the primary service panel and deliver it to the distribution service panel 52. In particular, the upper bus bars 94A, 94B and 94C are respectively connected to a set of lower bus bars 96A, 96B and 96C that carry power to the circuit breakers 50. The circuit breakers 50 and the operation of the distribution service panel 52 are conventional in nature, as is the TVSS unit (SPD) 55.

The service transfer switch unit 46 of the primary service panel 48 is operable to selectively delivery main power and alternate power via the bus bar network 94 to the distribution service panel 52. In particular, the main power breaker toggle switch 46A is used to selectively activate and deactivate main power to the distribution service panel 52 while the alternate power breaker toggle switch 46B is used to selectively activate and deactivate alternate power to the distribution service panel 52. Although not shown in FIG. 6, the interlock mechanism 46C of the service transfer switch unit 46 prevents simultaneous activation or deactivation of both the main power breaker toggle switch 46A and the alternate power breaker toggle switch 46B. The interlock mechanism 46C implements a conventional design wherein the mechanism is slidable between a left-hand position wherein only the main power breaker toggle switch 46A can be activated and a right-hand position wherein only the alternate power breaker toggle switch 46B can be activated.

The distribution service panel 52 is configured to receive main or alternate power from the primary service panel 48 in the manner described above, and to distribute the power to one or more subsidiary load circuits. As mentioned above in connection with FIG. 2, the distribution service panel 52 includes plural circuit breakers 50, several of which are shown in FIG. 6. Although the total circuit breaker capacity is thirty, it will be appreciated that capacity for a larger or smaller number of circuit breakers may be provided. The circuit breakers 50 are mounted to a conventional breaker support and bus bar framework 98. The upper portion of the framework 98 includes a pair of neutral connector blocks 98A and 98C for making neutral connections in the load circuits. The lower portion of the framework 98 carries the circuit breakers 50 using a conventional breaker mounting scheme that, by way of example, allows the circuit breakers to be snapped into place for engagement with one or more of the bus bars 96A, 96B and 96C, depending on the voltage to be delivered to the corresponding load circuit. A ground bar 100 located just above the alternate power connector compartment 57 is used for making ground connections in the load circuits. Load circuit wiring comes in from the apertures 4C.

Figure 8A:
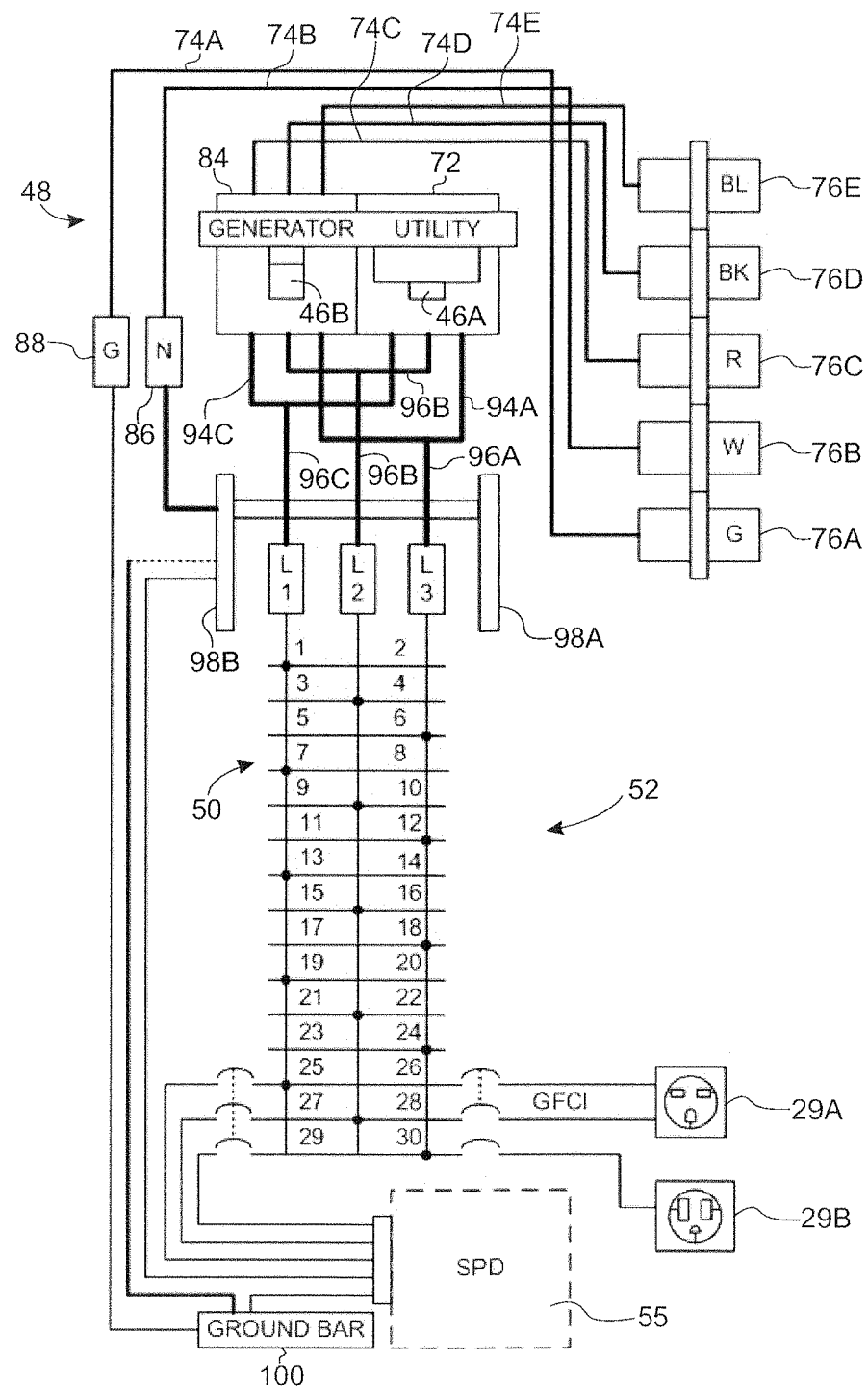
FIG. 8A is a schematic wiring diagram showing a three-phase embodiment of the panelboard enclosure of FIG. 1.
Figure 8B:
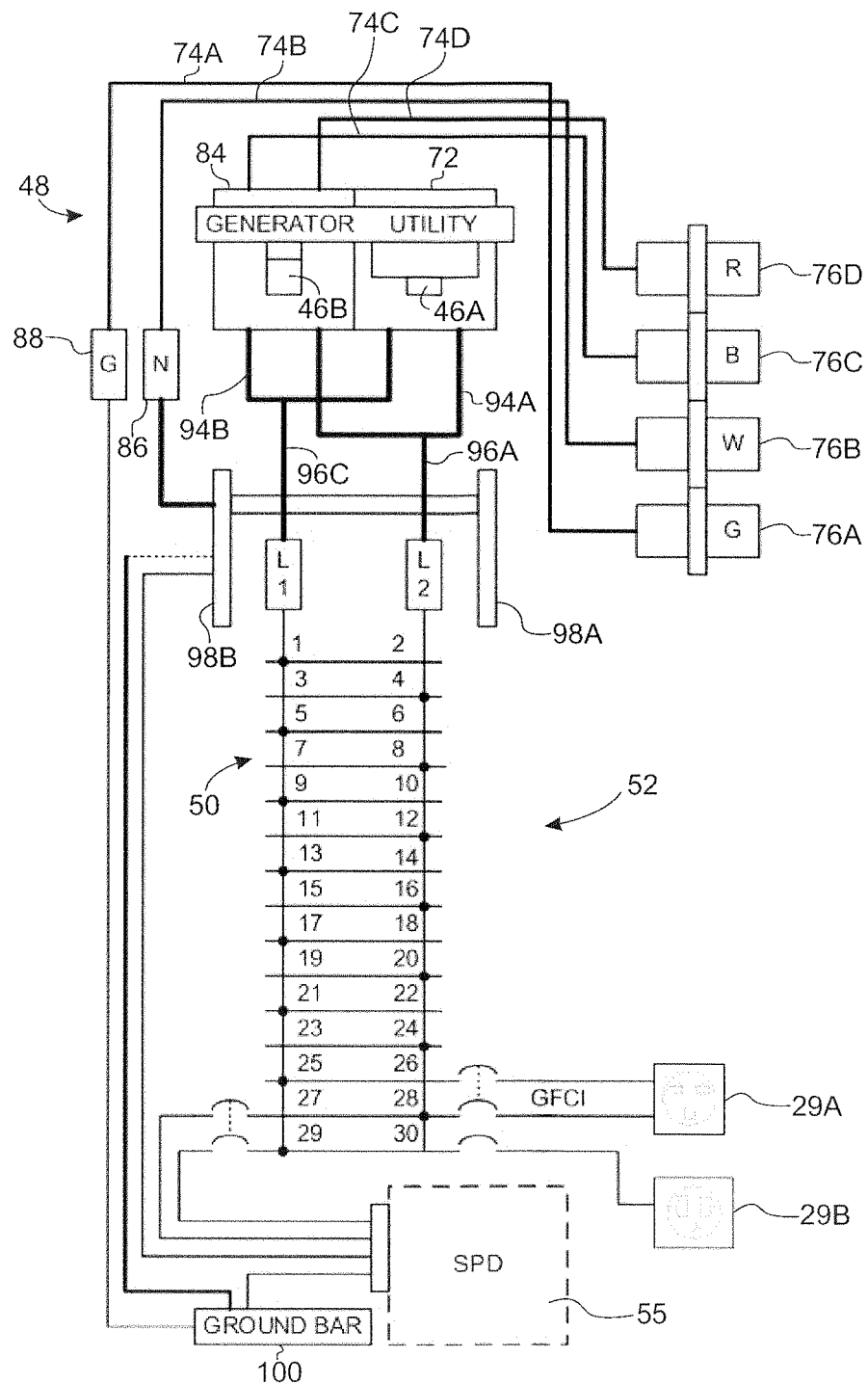
FIG. 8B is a schematic wiring diagram showing a single-phase embodiment of the panelboard enclosure of FIG. 1.

Schematics of the panelboard's electrical components are respectively shown in FIGS. 8A and 8B for three-phase and single-phase implementations. In the three-phase embodiment of FIG. 8A, there are five alternate power source wires 74, namely a ground wire 74A, a neutral wire 74B and three hot wires 74C, 74D and 74E. In the single-phase embodiment of FIG. 8B, only two hot wires 74C and 74D are required. Other electrical components of the primary service panel 48 and the distribution service panel 52 are identified by the use of corresponding reference numbers.

Using the alternate power source connector array 76 and the service transfer switch unit 46, a main power failure may be dealt with in the following manner. Upon a determination that power from the main power source has been interrupted, the access door 78 to the connector compartment 57 may be opened and individual cables of an alternative power source (e.g., a generator) may be connected to individual connectors of the alternate power source connector array 76. Alternatively, these steps may be skipped if an alternate power source is already connected. The service entrance door 22 may now be opened so that the main power breaker toggle switch 46A can be actuated to a power off position. The interlock mechanism 46C may then be manipulated to a position that allows actuation of the alternate power breaker toggle switch 46B while preventing actuation of the main power breaker toggle switch 46A. Actuating alternate power breaker toggle switch 46B to a power-on position will apply power from the alternate power source to the distribution service panel 52. At this point, the power cutoff switch mechanism 3 may be placed in a power-off position. This position will allow the power cutoff switch mechanism 3 to engage the powered-off main power breaker toggle switch 46A as the service entrance door 22 closes.

Turning now to FIGS. 9-13, the panelboard enclosure 2 may be constructed using an arrangement in which the primary service panel 48, the distribution service panel 52, the alternate power source connector array 76, the alternate power source wiring 74 and the service transfer switch unit 46 are part of an installable panelboard assembly 102 that is mountable as a unit within the enclosure housing 4 (not shown in FIGS. 9-12). Advantageously, this allows nearly the entire panelboard 2 to be assembled, tested and installed at a manufacturer's facility, with all of the alternate power source wiring connections being made. Field installation of the enclosure 2 only requires connection of the main power source wiring 65 and the load circuit wiring that connects to the distribution service panel 52.

The panelboard assembly 102 is constructed with a base panelboard assembly frame 104. The base assembly frame 104 can be fabricated from sheet steel or the like that is formed or assembled to provide a desired configuration. In the embodiment of FIGS. 9-12, the base assembly frame 104 is configured as an elongated channel having a relatively wide component mounting platform 106 and a pair of comparatively narrow side sections 108 and 110. The front side of the mounting platform 106 (shown in FIGS. 9 and 10) mounts the components of the primary service panel 48 (including the service transfer switch unit 46) and the components of the distribution service panel 52 (including the framework 98 and the SPD 55). The rear side of the mounting platform 106 (shown in FIG. 11) mounts the connector array 76. Each side section 108 and 110 is formed with a respective flange 108A and 110A that is provided with mounting holes 112 for fastening the base assembly frame 104 to the back 20 of the enclosure housing 4.

Figure 11:
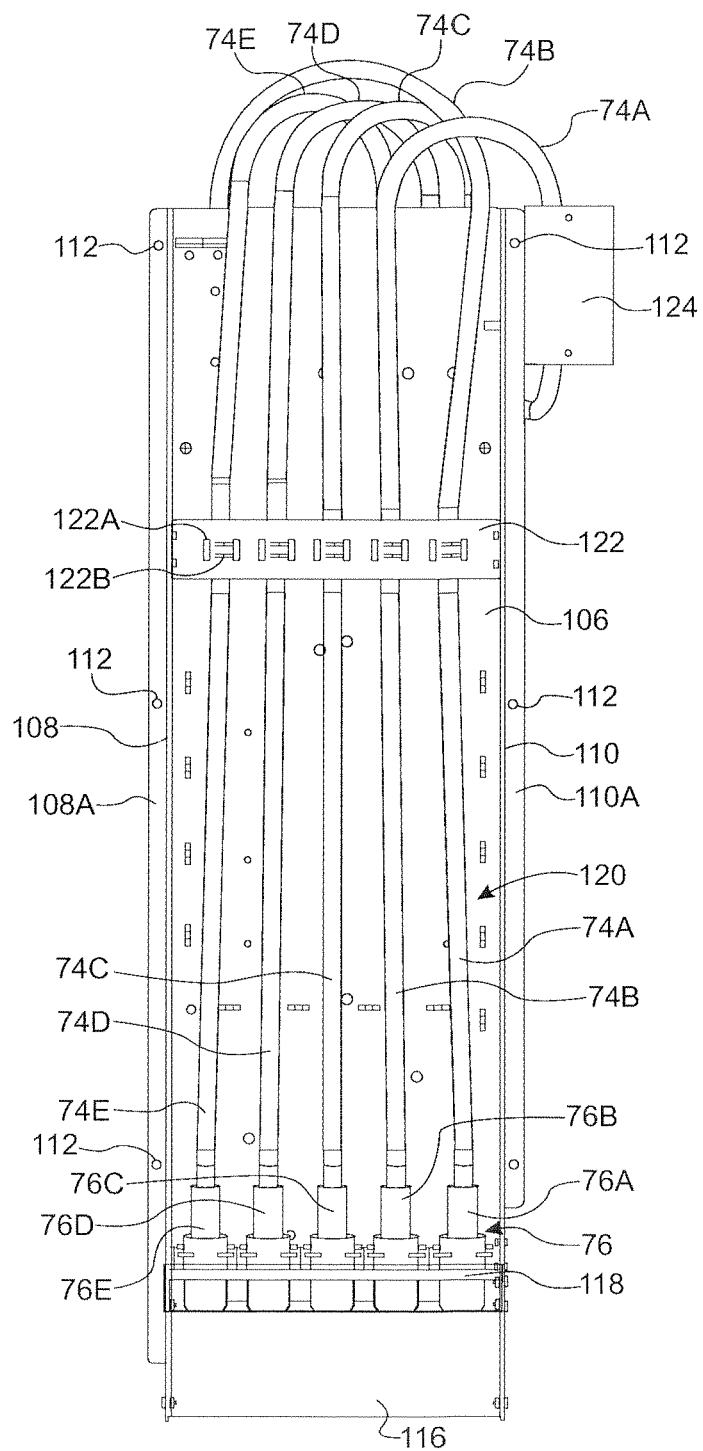
FIG. 11 is a rear elevation view showing the service assembly of FIG. 9.
Figure 13:
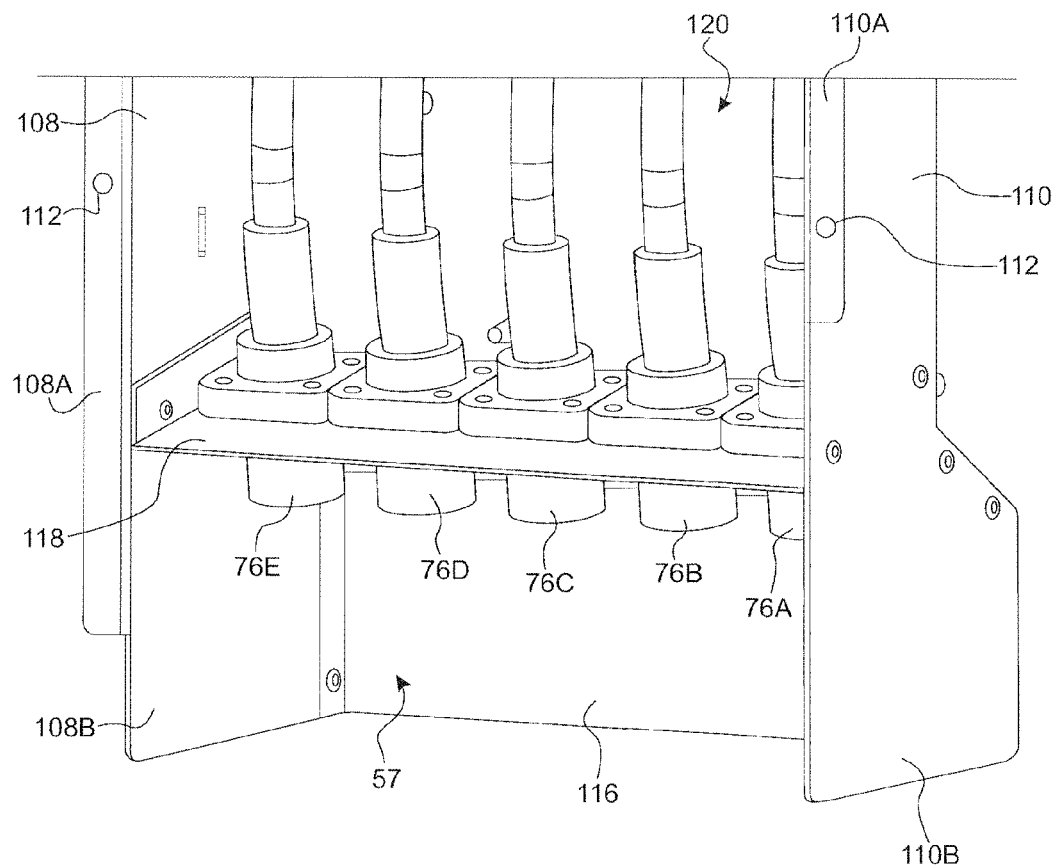
FIG. 13 is partial perspective view showing a lower rear portion of the service assembly of FIG. 9.

Near the bottom of the base assembly frame 104, the mounting platform 106 terminates at its lower end and the side sections 108 and 110 are respectively provided with forwardly extending flanges 108B and 110B. The flanges 108B and 110B define the sides of the connector compartment 57. They also support an angled view window frame member 114 (that contains the viewing window 57A) and a front member 116. As can be seen in FIG. 11, the connector array 76 is supported by a connector array mounting plate 118 that closes off the top of the connector compartment 57. FIG. 13 shows that the connector array mounting plate 118 may be angled in order to orient the alternate power source connector array 76 slightly forwardly to aid in making connections thereto.

Figure 9:
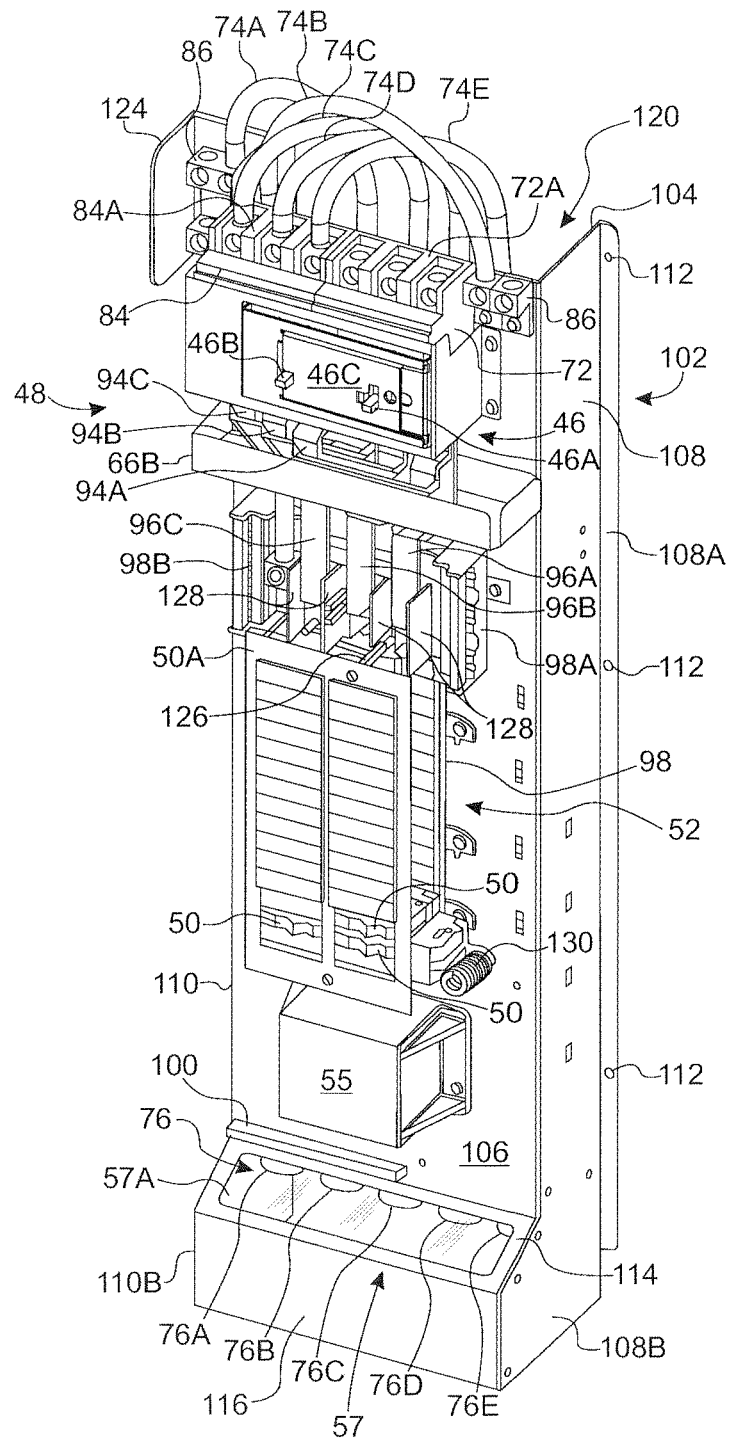
FIG. 9 is a perspective view showing a service assembly that may be installed in the panelboard enclosure of FIG. 1.
Figure 10:
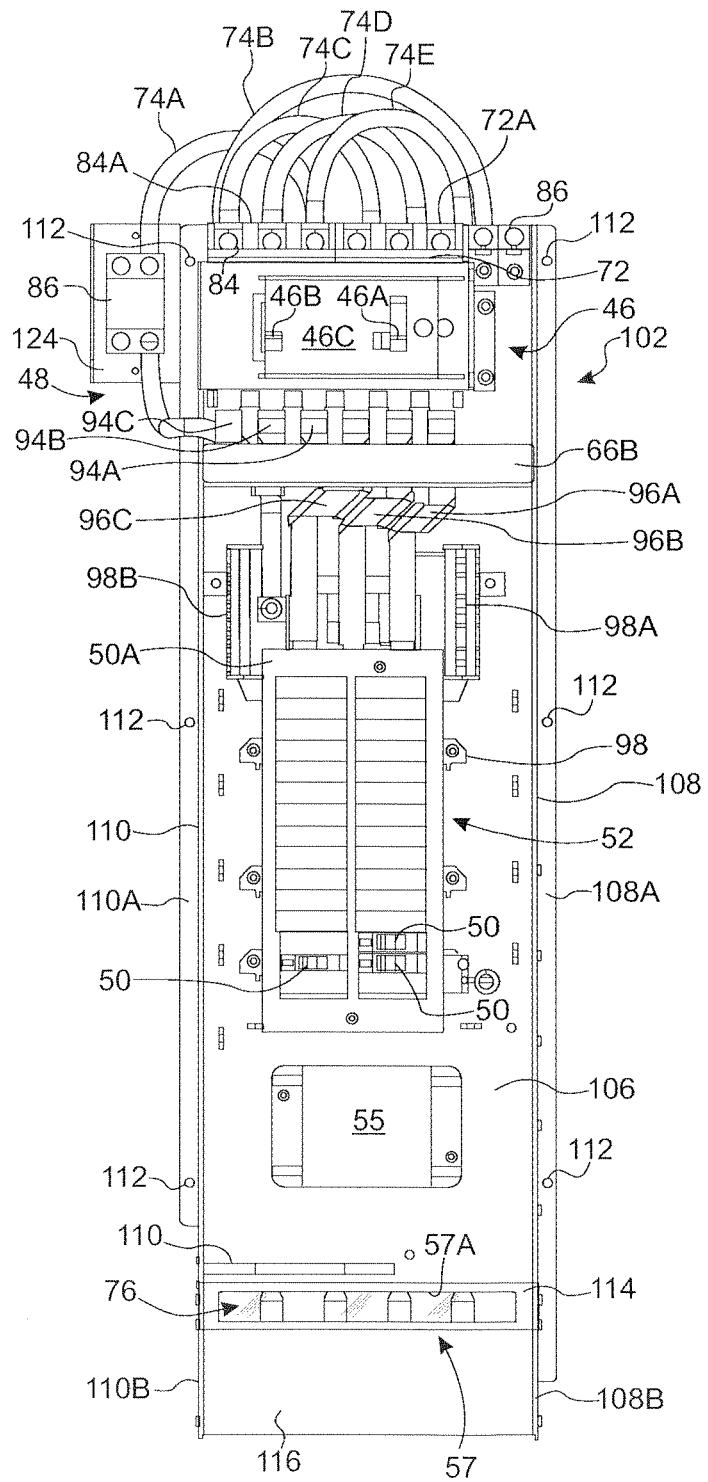
FIG. 10 is a front elevation view showing the service assembly of FIG. 9.
Figure 12:
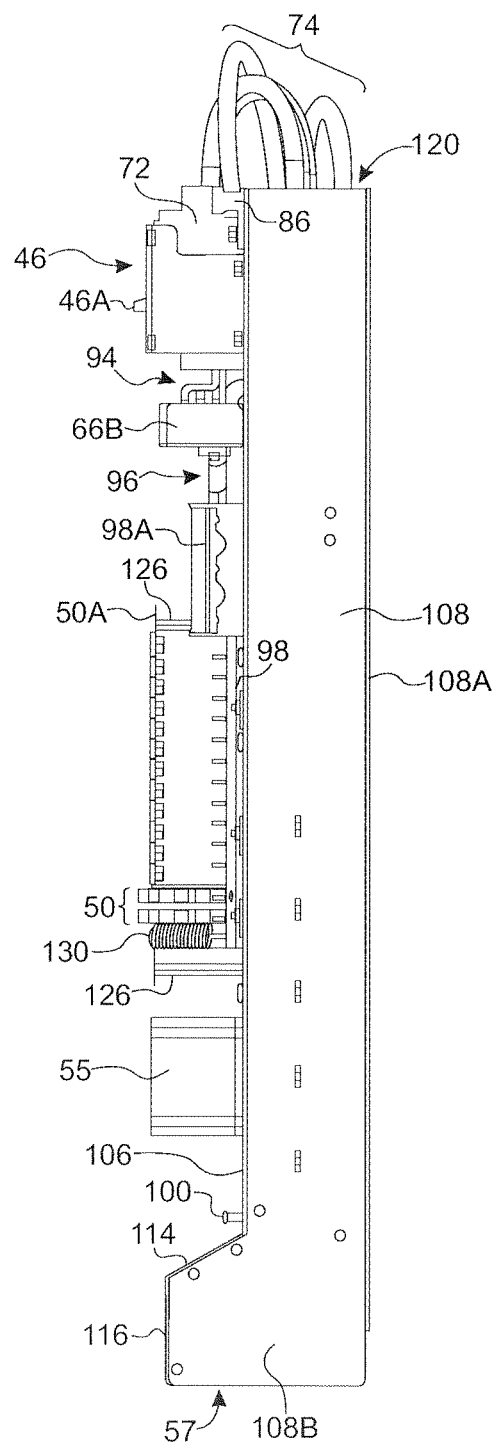
FIG. 12 is a side elevation view showing the service assembly of FIG. 9.

As can be seen in FIGS. 9, 11 and 12, the side sections 108 and 110 are sized to space the mounting platform 106 from the back 20 of the enclosure housing 4 (which is flush with the flanges 108B and 110B). The mounting platform 106 is spaced by an amount that is sufficient to provide an alternate power source wireway 120 that carries the alternate power source wiring 74 within a protected compartment. As also shown in FIG. 11, the alternate source wiring 74 can be supported in the wireway 118 by a wire support bracket 122. The support bracket 122 mounts to the side sections 108 and 110 and spans the wireway space therebetween. Several pairs of slots 122A may be formed in the wire support bracket 122 in order mount cable ties 122B that wrap around each of the alternate power source wires 74.

Additional items of interest that are shown in FIGS. 9-12 include the previously mentioned barrier plate stub 66B disposed between the primary service panel 48 and the distribution service panel 52. As discussed, the barrier plate stub 66B is part of the main barrier plate 66 that provides isolation between the primary service panel 48 and the distribution service panel 52. As should be apparent from FIG. 9, the barrier plate stub 66B includes apertures for routing elements of the bus network 94/96 that interconnects the primary service panel 48 and the distribution service panel 52. Further items not previously mentioned in connection with FIGS. 9-12 include (1) a channel member 124 that may be mounted to the top of side section 110 and used to support the neutral connector block 86, (2) standoff fasteners 126 for mounting the circuit breaker face plate 50A to the bus bar framework 98, (3) insulative dividers 128 on the bus bar framework 98 that isolate the lower bus bars 96A, 96B and 96C from each other, and (4) a coil spring 130 that provides a spring load on the lower dead front door 44 when it is latched shut and which facilitates opening when the door is unlatched.

As indicated above, the panelboard assembly 102 allows nearly the entire panelboard 2 to be assembled, tested and installed at a manufacturer's facility, with very little field installation being required to place the panelboard in service. These operations may be performed in the following manner. First, the panelboard assembly 102 is preferably pre-assembled before it is installed in the enclosure housing 4. Pre-assembly includes mounting the components of the primary service panel 48, the distribution service panel 52, the alternate power source connector array 76, the alternate power source wiring 74 and the service transfer switch unit 46 to the assembly frame 104. If desired, the panelboard assembly 102 may be tested at this point to verify the integrity of its components and wiring connections. The panelboard assembly 102 may now be installed in the enclosure housing 4, as by fastening the flanges 108A of the base assembly frame 104 to the back 8 of the enclosure housing. This completes the panelboard 102, such that is now ready for transport to an installation location. At the location, the panelboard 102 is installed by mounting it to an appropriate support structure. Electrical connections may now be made. This includes connecting the load circuit wiring to the distribution service panel. The main power source wiring will also be routed through the main power source wireway and connected to the main power breaker 72.

Figure 14:
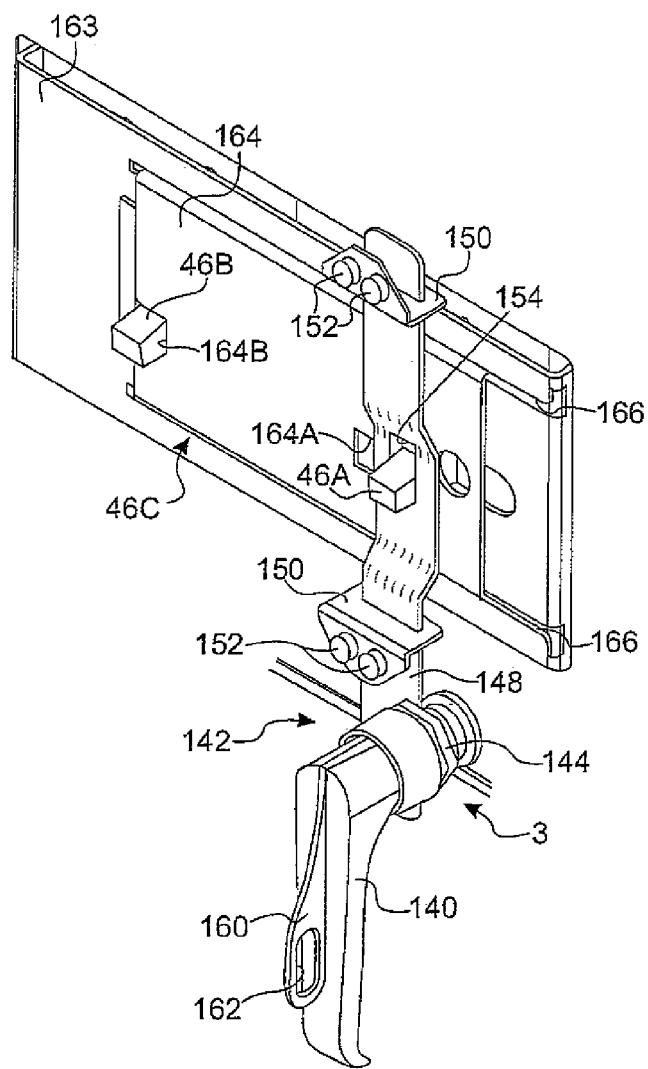
FIG. 14 is an enlarged perspective view showing a power cutoff switch mechanism of the panelboard enclosure of FIG. 1.

Turning now to FIGS. 14-16, an example embodiment of the power cutoff switch mechanism 3 first mentioned in connection with FIG. 1 will be described. As previously discussed, the power cutoff switch mechanism 3 is operable from outside the service entrance door 22 (not shown in FIGS.

14-16) to mechanically engage and deactivate the main power breaker toggle switch 46A and cutoff main power without having to open the service entrance door. In the embodiment of FIGS. 14-16, the power cutoff switch mechanism 3 includes a handle 140 that extends from the outer end of a rotatable hub assembly 142. A central portion of the hub assembly 142 extends through an aperture (not shown) in the service entrance door 22 and is secured thereto using a conventional backing nut 144. The inner end of the hub assembly 142 mounts a crank arm 146. The free end of the crank arm 146 is coupled to a slidable switch bar 148. The switch bar 148 is slidably mounted to the inside surface of the service entrance door 22 using a pair of upper and lower mounting brackets 150. The mounting brackets 150 can be riveted or otherwise attached to the entrance door 22 using rivets or other types of fasteners 152. Each mounting bracket 150 is formed with a slot in which the switch bar 148 is slidably disposed.

The switch bar 148 includes a central slot aperture 154 that directly engages the main power breaker toggle switch 46A for manipulation between a power-on state and a power-off state as the handle 140, the hub assembly 142 and the crank arm 146 are rotated. In order to effect this motion, the hub assembly 142 is off-center from the switch bar 148 and the crank arm 146 is configured with a cam follower pin 156 that operatively engages a cam slot 158 (providing a cam surface) on the switch bar. This arrangement serves to linearly drive the switch bar 148 when the handle 140, the hub assembly 142 and the crank arm 144 are rotated. As shown in FIG. 16, a section 159 of the switch bar 148 that carries the aperture 154 may be rearwardly offset from the remainder of the switch bar. This positions the aperture 154 at the base of the main power breaker toggle switch 46A to help ensure that the switch bar 148 will not become decoupled therefrom.

If desired, the handle 140 may be provided with a conventional lock clasp 160 for securing the handle in a power-on position. The lock clasp 160 is pivotally mounted to the handle 140 so as to be movable between a locking position wherein the handle 140 is locked against rotation and an unlocking position wherein the handle is free to rotate. The locking position is shown in FIGS. 14-16. In this position, the bottom lock clasp 160 is pivoted outwardly from the handle 140. Pivoting the bottom of the lock clasp 160 into the handle 140 places the lock clasp in the unlocking position. As can be seen in FIGS. 14 and 16, the lock clasp 160 includes a small opening 162 that is capable of receiving a padlock when the lock clasp is in its locking position. The padlock prevents the lock clasp 160 from being pushed to the unlocking position. In the event of an emergency requiring power shutoff, the padlock can be removed in any required manner (including by cutting it off with lock cutters) in order to allow the power cutoff switch mechanism 3 to be operated.

Before leaving FIGS. 14-16, it should be mentioned that FIG. 14 shows additional details of the interlock mechanism 46C of the service transfer switch unit 46. In particular, the interlock mechanism 46C includes a base plate 163 that mounts over the main power breaker 72 and the alternate power breaker 84 (not shown in FIG. 14). The interlock mechanism 46C further includes a slide member 164 that is slidably mounted in a pair of slots 166 formed in the base plate 163. The slide member 164 is formed with cutouts 164A and 164B that respectively engage the main power breaker toggle switch 46A and the alternate power breaker toggle switch 46B. The right-hand cutout 164A is formed as a reverse "L" and the left-hand cutout 164B is formed as a notch. When the slide member 164 is in the left-hand position shown in FIG. 14, the main power breaker toggle switch 46A is free to toggle up (power on) and down (power off) within the vertical portion of the right-hand cutout 164A. This is the position that slide member 164 would normally be in when the enclosure 2 is receiving main power.

When the main power beaker toggle switch 46A is toggled up and the main power is on, the slide member 164 cannot be slid to the right and the alternate power breaker toggle switch 46B cannot be operated due to being captured by the left-hand cutout 164B. In the event that power from an alternate power is required, the main power breaker toggle switch 46A must first be toggled down to shut off the main power. Only then may the slide member 164 be slid to the right in order to operate the alternate power breaker toggle switch 46B. In this position, the main power breaker toggle switch 46A is captured by the lower portion of the right-hand cutout 164A, thus preventing the main power from being turned on.

Figure 17:
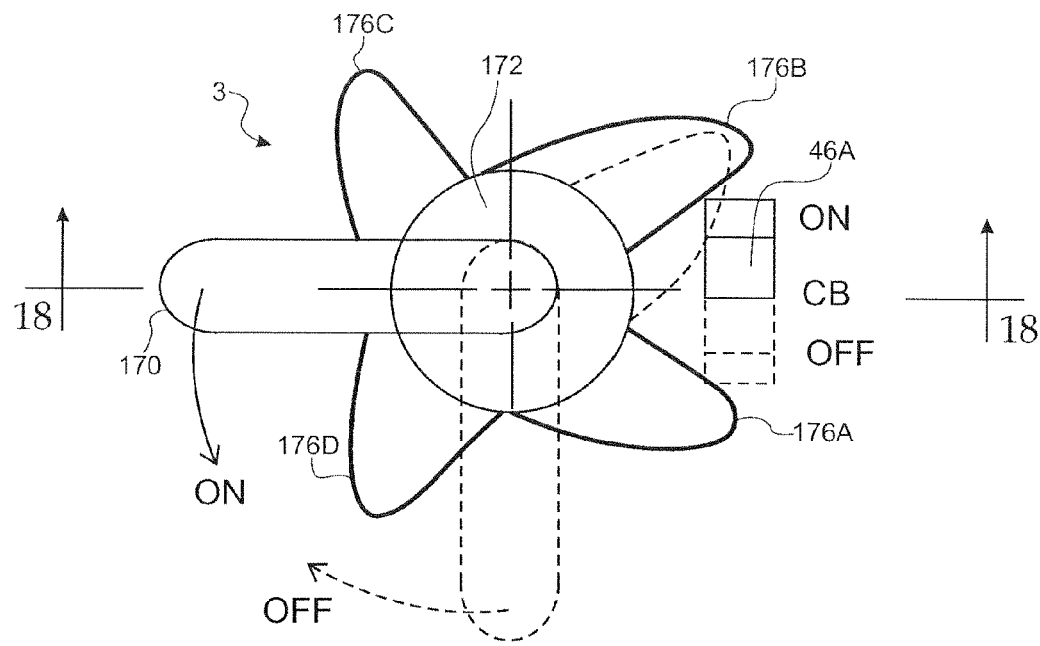
FIG. 17 is a plan view showing an alternate embodiment of a power cutoff switch mechanism that may be used in the panelboard enclosure of FIG. 1.
Figure 18:
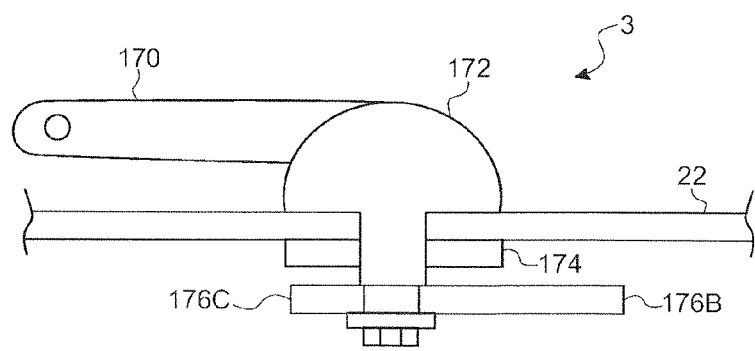
FIG. 18 is a cross-sectional view taken along line 18-18 in FIG. 17.

Turning now to FIGS. 17-18, an alternate embodiment of the power cutoff switch mechanism 3 is shown. In this embodiment, the power cutoff switch mechanism 3 includes a handle 170 that extends from the outer end of a rotatable hub assembly 172. A central portion of the hub assembly 172 extends through an aperture in the service entrance door 22 and is secured thereto using a conventional backing nut 174. The inner end of the hub assembly 172 mounts a pair of arm members 176A and 176B. The power cutoff switch mechanism 3 is located on the service entrance door so that free ends of arm members 176A and 176B can directly engage the main power breaker toggle switch 46A as the handle 170 is rotated. The arm members 176A and 176B respectively extend below and above the main power breaker toggle switch 46A. The lower arm member 176A is operative to power on the main power breaker power toggle switch 46A when the handle 170 is rotated to the downward position shown in FIG. 17. The upper arm member 176B is operative to power off the main power breaker toggle switch 46A when the handle is rotated to the leftward position shown in FIG. 17.

As further shown in FIG. 17, additional arm members, such as arm members 176C and 176D may be mounted to the hub assembly 172. This allows the handle 170 to be in virtually any position when the service entrance door 22 is closed, so long as one of the arm members 176A-D is not directly over the main power breaker toggle switch 46A. Turning the handle 170 counterclockwise will always cause one of the arm member 176A-D to turn on the main power breaker toggle switch 46A, while turning the handle 170 clockwise will have the opposite effect. It will also be appreciated that the same result could be achieved with only a single arm member, albeit the handle 170 may need to be turned nearly 360 degrees to activate the main power breaker toggle switch 46A, depending on the handle's position when the service entrance door 22 is closed.

Figure 19:
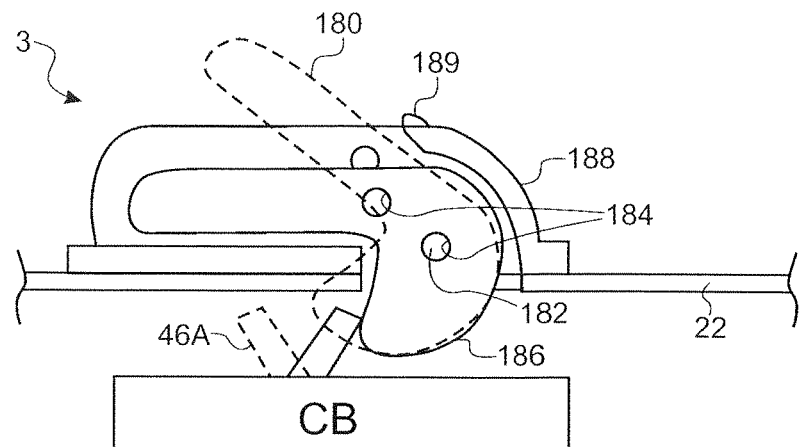
FIG. 19 is a plan view showing another alternate embodiment of a power cutoff switch mechanism that may be used in the panelboard enclosure of FIG. 1.

Turning now to FIG. 19, another alternate embodiment of the power cutoff switch mechanism 3 is shown. In this embodiment, the power cutoff switch mechanism 3 includes a handle 180 that is pivotally mounted to an outer side of the service entrance door 22. The handle 180 can be pivotally mounted on a pivot pin 182 that extends through a pin-receiving aperture 184 formed at a selected location on the handle. Note that several apertures 184 may be provided for adjustment purposes. The handle 180 further includes a cam lobe 186 that extends through the service entrance door 22. The cam lobe 186 is operative to power off the main power breaker toggle switch 46A as the handle 180 is pivoted from a home position in which it is generally parallel to the service entrance door and an open position wherein the handle has been pulled outwardly. Proper positioning of the cam lobe 186 relative to the main power breaker toggle switch 46A can be obtained by selecting the appropriate handle aperture 184 for receiving the pivot pin 182. Note that this embodiment of the power cutoff switch mechanism 3 only allows the main power breaker toggle switch 46A to be turned off. To restore main power, the main power breaker toggle switch 46A must be manually switched and the handle 180 must be placed in its home position before closing the service entrance door 22. If desired, a protective cover 188 may be mounted on the service entrance door 22 to protect the handle and pivot components from the elements. A drip lip 189 will help divert water from this area.

Figure 20:
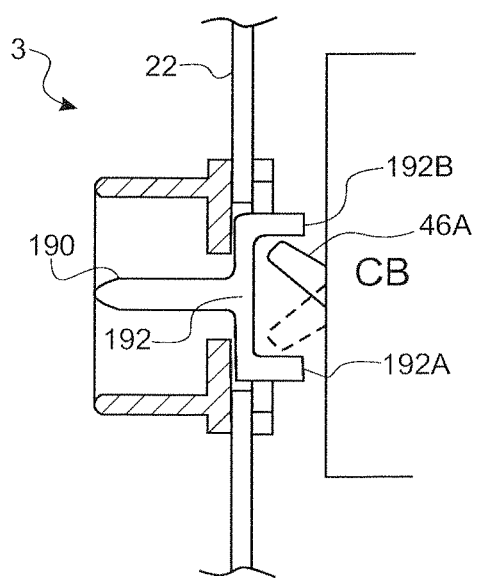
FIG. 20 is a plan view showing a further alternate embodiment of a power cutoff switch mechanism that may be used in the panelboard enclosure of FIG. 1.

Turning now to FIG. 20, another alternate embodiment of the power cutoff switch mechanism 3 is shown. In this embodiment, the power cutoff switch mechanism 3 includes a slidable handle 190 that is mounted on an outer side of the service entrance door 22. The handle 190 includes a fork 192 that extends through the service entrance door 22 and is operative to selectively power on and power off the main power breaker toggle switch 46A as the handle is slid between upper and lower positions. In particular, a lower prong 192A of the handle fork 192 is operative to power on the main power breaker power toggle switch 46A when the handle 190 is slid upwardly in FIG. 20. An upper prong 192B of the handle fork 192 is operative to power off the main power breaker power toggle switch 46A when the handle 190 is slid downwardly in FIG. 20. If only a power-off feature is required, the lower prong 172A would not be required.

Using any of the power cutoff switch mechanism embodiments disclosed above, the panelboard 2 may be operated to arm the power cutoff switch mechanism 3 in the following manner. First, the service entrance door 22 is opened to gain access to the interior equipment chamber 20. If the alternate power breaker toggle switch 46B is in the power-on position, it should be turned off. The interlock mechanism 46C may be manipulated by sliding it to the left to allow actuation of the main power breaker toggle switch 46A. The main power breaker toggle switch 46 may now be actuated to its power-on position to apply power from the main power source to the distribution service panel 52. Before the service entrance door 22 is closed, the power cutoff switch mechanism 3 should be placed in its power-on position. The service entrance door 22 may now be closed so that the power cutoff switch mechanism 3 engages the main power breaker toggle switch 46A. The power cutoff switch mechanism 3 will now be armed and positioned to deactivate the main power breaker toggle switch 46A. In case of an emergency or other event requiring a main power cutoff, the power cutoff switch mechanism 3 may be actuated to deactivate the main power breaker toggle switch 46A and cutoff main power to the distribution service panel 52, all while the service entrance door 22 remains closed.

Turning now to FIGS. 21-24B, a modification of the panelboard enclosure 2 is shown in which a lockout system is provided to prevent the service entrance door 22 from being secured in the closed position unless the main power breaker 72 (see FIG. 6) and the power cutoff switch mechanism 3 are in the same state (i.e., both in a power-on state or both in a power-off state). This feature ensures that the handle 140 (see FIG. 22) of the power cutoff switch mechanism 3 (when viewed from outside the panelboard enclosure 2) will always correspond to and provide a visual indication of the position of the main power breaker toggle switch 46A, and thus the state of the main power breaker 72. Moreover, proper registration between the power cutoff switch mechanism 3 and the main power breaker toggle switch 46 will be assured in order to guarantee proper operation.

If the power cutoff switch mechanism 3 and the main power breaker 72 are not in the same state, the service entrance door 22 cannot be closed and latched. As a further feature of the lockout system of this embodiment, the cam locks 30, 32 and 34 may be interconnected by a linkage 202 (see FIG. 21). In addition, the cam locks 30, 32 and 34 may be configured so that only one of them, such as the middle cam lock 32, is accessible from the front of the service entrance door 22. As described in more detail below, these features help prevent forced door closure without proper registration between the power cutoff switch mechanism 3 and the main power breaker toggle switch 46.

By way of introduction, the lockout system in the embodiment of FIGS. 21-24B includes a first lockout component (described below) associated with the power cutoff switch mechanism 3 and a second lockout component (described below) associated with the main power breaker 72. The first lockout component is a component of the power cutoff switch mechanism 3 that is movably mounted on an inside of the service entrance door 22. The second lockout component is a component of the main power breaker 72 that is movably mounted to actuate the main power breaker toggle switch 46A. The first lockout component and the second lockout component are configured for nested engagement with each other when the main power breaker 72 and the power cutoff switch mechanism 3 are in the same state, and are configured for non-nested engagement with each other when these components are not in the same state. In particular, the first lockout component comprises a protrusion that may be formed as any type of convexity, jut, projection, key, bulge, prong or protuberance, and the second lockout component comprises a recess that may be formed as any type of concavity, hole, hollow, dent, keyway, depression or pit that is capable of wholly or partially receiving or otherwise engaging the protrusion. The protrusion engages the recess when the lockout components are in nested engagement, but not when the lockout components are in non-nested engagement.

Figure 22:
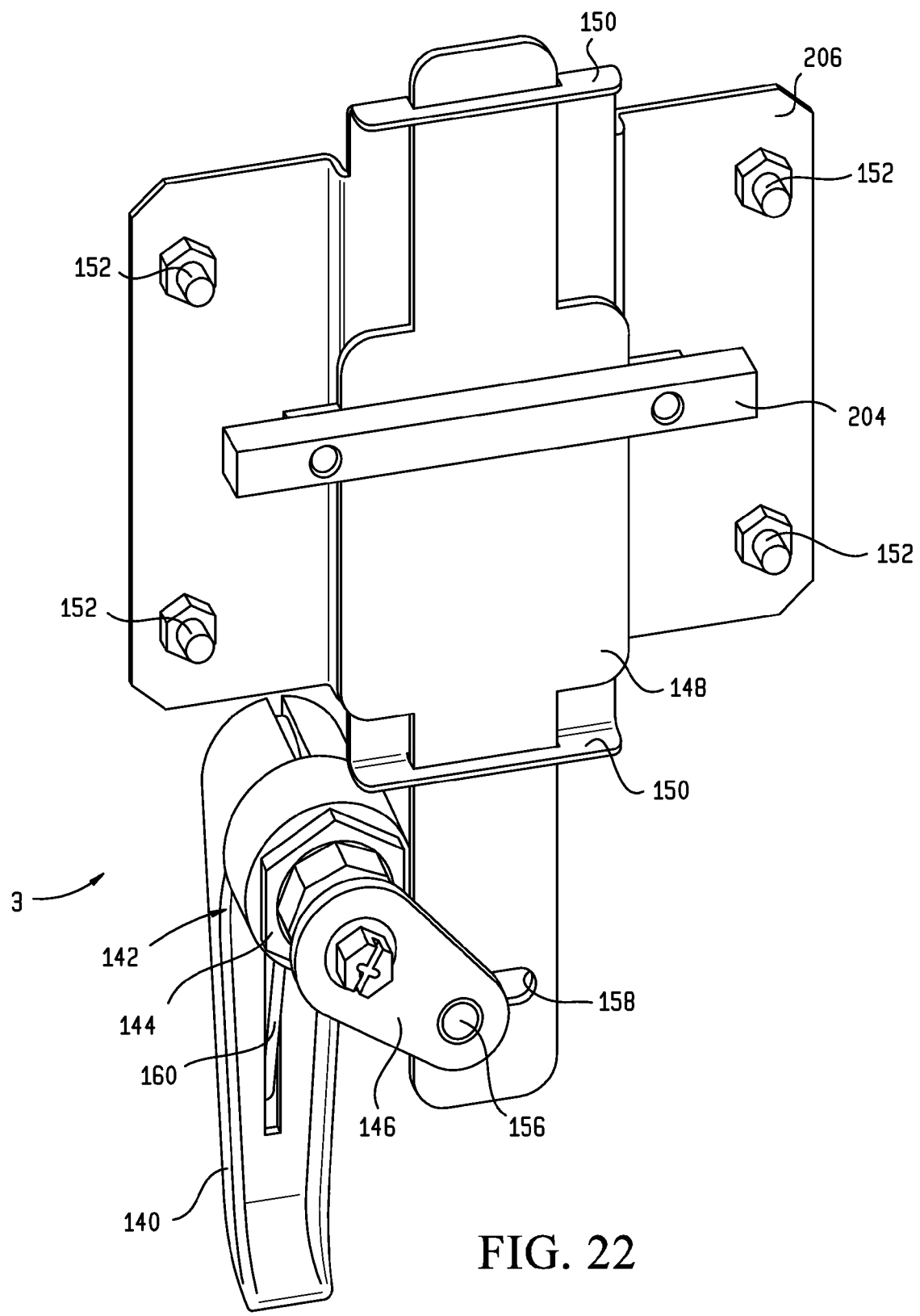
FIG. 22 is a perspective view showing a power cutoff switch mechanism of the panelboard enclosure of FIG. 21.

With reference now to FIG. 22, the power cutoff switch mechanism 3 is modified from the construction shown in FIG. 15 by virtue of the fact that the vertically slidable switch bar 148 on the inside of the service entrance door 22 is formed with a cross bar 204 instead of a central slot aperture 154. The slidable switch bar 148 represents an embodiment of a first lockout component and the cross bar 204 represents an embodiment of a first lockout component protrusion. As a further modification, the mounting brackets 150 that slidably support the switch bar 148 can be optionally formed on (or mounted to) a common channel-shaped base member 206 for added stiffness and durability of the power cutoff switch mechanism 3. The base member 206 can be bolted or otherwise attached to the entrance door 22 using bolts or other types of fasteners 152. The remaining components of the power cutoff switch mechanism 3, together with their operational features, are substantially the same as those shown and described above in connection with FIGS. 14-16, as indicated by the use of corresponding reference numbers.

Figure 23:
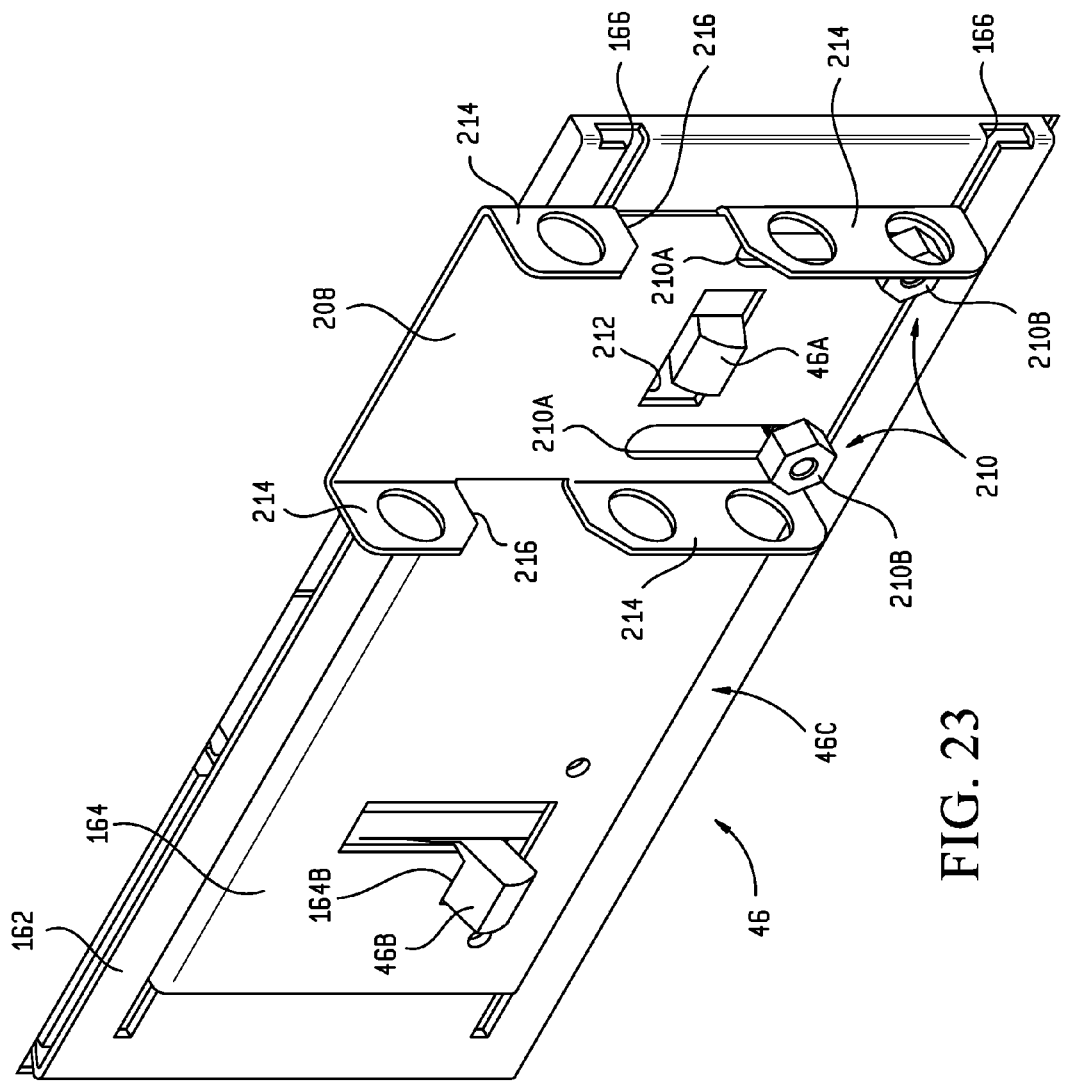
FIG. 23 is a perspective view showing a service transfer switch unit of the panelboard enclosure of FIG. 21 that includes main power breaker toggle switch and a main breaker position indicator.

With reference now to FIG. 23, the service transfer switch unit 46 is modified from the construction shown in FIG. 14 by virtue of the fact that the interlock mechanism 46C is provided with a main breaker position indicator 208. The main breaker position indicator 208 is slideably mounted for vertical movement on the interlock mechanism's slide member 164 using a bolt-and-slot arrangement 210. In this bolt-and-slot arrangement, the main breaker position indicator 208 is provided with a pair of vertical slots 210A that slide up and down on a pair of bolts or other fasteners 210B mounted to the slide member 164. The main breaker position indicator 208 also includes a central slot aperture 212 that directly engages the main power breaker toggle switch 46A. Up and down movement of the main breaker position indicator 208 will manipulate the power breaker toggle switch 46A so that the main power breaker 72 (not shown in FIG. 23) is transitioned between its power-on state and its power-off state. This up and down movement is provided by the switch bar 148 of the power cutoff switch mechanism 3 as the handle 140 is actuated from the front of the service entrance door 22. The manner in which the switch bar 148 engages the main breaker position indicator 208 will now be described.

Figures 24A, 24B:
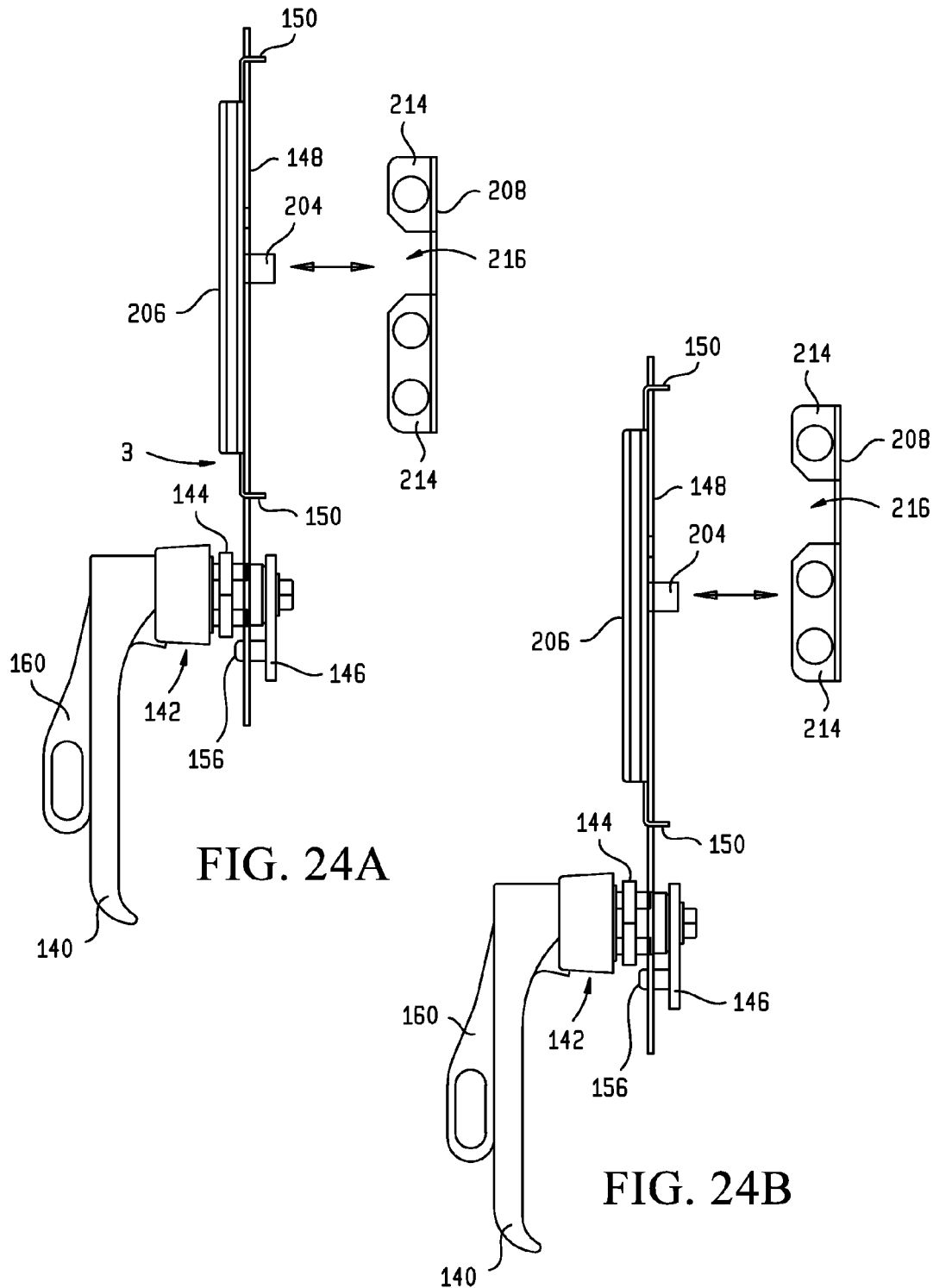
FIG. 24A is a perspective view showing an aligned position of a power cutoff switch mechanism and a main breaker position indicator of the panelboard enclosure of FIG. 21.
FIG. 24B is a perspective view showing an offset position of a power cutoff switch mechanism and a main breaker position indicator of the panelboard enclosure of FIG. 21.

The main breaker position indicator 208 may be configured as a channel having a pair of rigid sidewalls 214 that are formed with mutually horizontally aligned notches 216. The main breaker position indicator 208 represents an embodiment of a second lockout component and the notches 216 represent an embodiment of a second lockout component recess. The notches 216 are located and sized to receive the cross bar 204 of FIG. 22 in nested engagement when the slidable switch bar 148 is properly aligned with the main breaker position indicator 208. This alignment position is shown in FIG. 24A. In this figure, the power cutoff switch mechanism 3 is in a position that represents its power-off state and the main breaker position indicator 208 is in a position that represents the power-off state of the main power breaker 72. Although not shown, proper alignment between the slidable switch bar 148 and the main breaker position indicator 208 will also be achieved when the power cutoff switch mechanism 3 and the main power breaker 72 are both in the power-on state.

If the slidable switch bar 148 and the main breaker position indicator 208 are not aligned, the cross bar 204 will not engage the notches 216 and will instead hit against the edges of the sidewalls 214. This non-aligned or offset position is shown in FIG. 24B. In this figure, the power cutoff switch mechanism 3 is in a position that represents its power-off state and the main breaker position indicator 208 is in a position that represents the power-on state of the main power breaker 72. Although not shown, misalignment between the slidable switch bar 148 and the main breaker position indicator 208 will also result when the power cutoff switch mechanism 3 is in the power-on state and the main power breaker 72 is in the power-off state.

Figure 21:
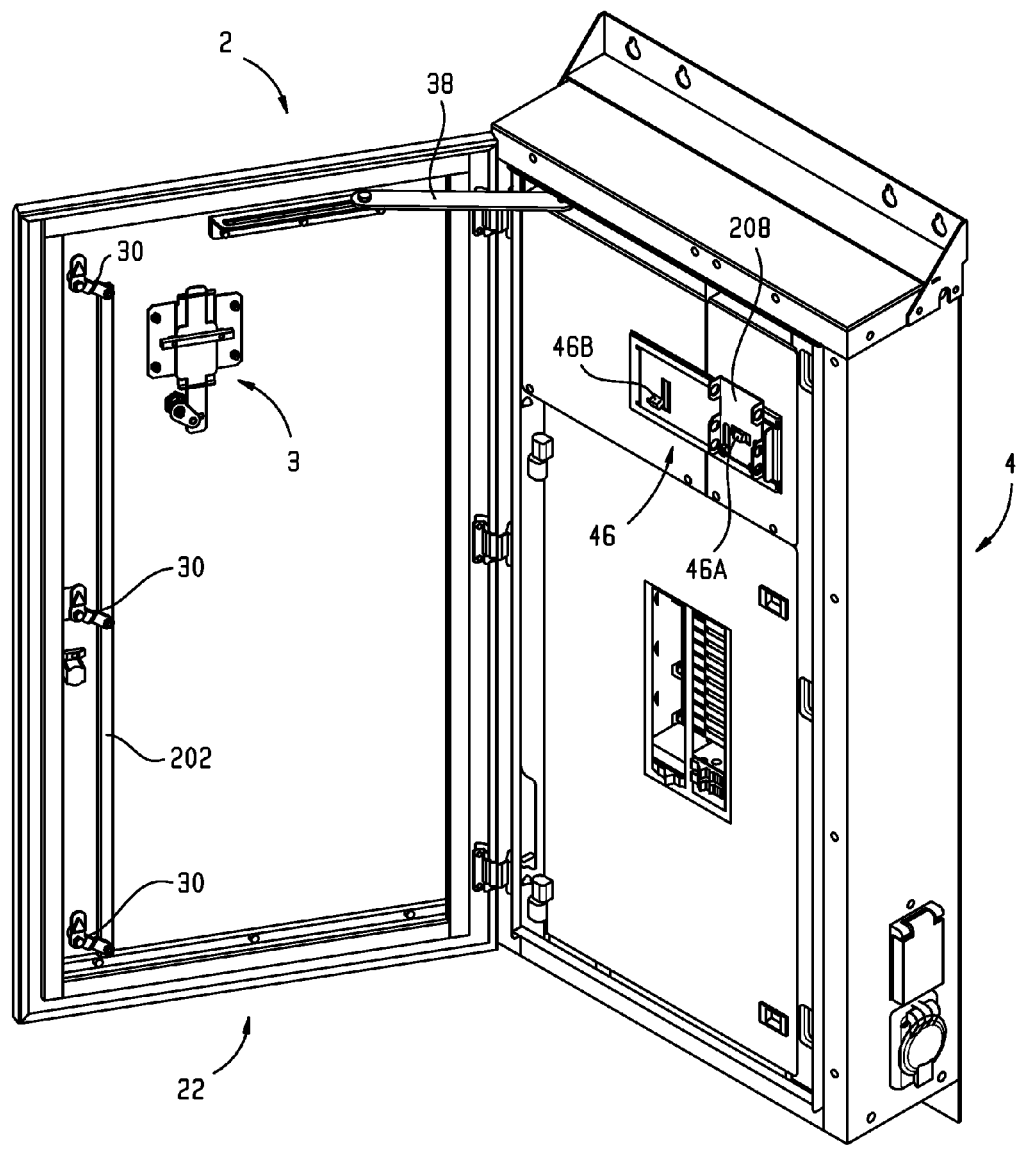
FIG. 21 is a perspective view showing a modified version of the panelboard enclosure of FIG. 1.

Proper engagement of the cross bar 204 into the notches 216 is required in order to close and latch the service entrance door 22, and to enable the power cutoff switch mechanism 3 to operate the main power breaker 72. If there is misalignment, the height of the rigid sidewalls 214 is such that the service entrance door 22 will not be fully closable when the cross bar 204 hits against the sidewall edges. In the unlikely event that someone tries to deform the service entrance door 22 into a closed position by using excessive closure force, any attempt to then latch the door closed will be extremely difficult due to the previously-mentioned design modification made to the cam locks 30, 32 and 34. As shown in FIG. 21, the linkage 202 interconnects each of the cam locks 30, 32 and 34 so that they operate in unison. This means that all three cam locks must be engaged to properly secure the service entrance door 22. It will not be possible to latch only one or two of the cam locks 30, 32 and 34. In addition, only one of the cam locks is accessible from the front of the service entrance door 22. This means that the key used to actuate the exposed cam lock must impart approximately three times the torque needed to rotate one cam lock. If the service entrance door 22 is deformed, simultaneous actuation of all three cam locks 30, 32 and 34 is highly unlikely to be successful.

Turning now to FIGS. 25-27B, an alternative lockout system is shown. Although this lockout system may be used with the panelboard enclosure 2 of the previously-described embodiment, FIGS. 25-27B illustrate an alternative use in the context of an alternative panelboard enclosure does not include a power transfer switch arrangement. As in the embodiment of FIGS. 21-24B, the lockout system of FIGS. 25-27B may be implemented using a first lockout component associated with a door-mounted power cutoff switch mechanism (e.g., the power cutoff switch mechanism 302 of FIG. 25) and a second lockout component associated with a service panel-mounted main power breaker (e.g., the dual-unit main power breaker 304 of FIG. 26). Again, the first lockout component and the second lockout component are configured for nested engagement with each other when the main power breaker 304 and the power cutoff switch mechanism 302 are in the same state, and are configured for non-nested engagement with each other when these components are not in the same state. Unlike the previous lockout system embodiment, the first lockout component of the present embodiment includes a recess while the second lockout component includes a protrusion. The protrusion engages the recess when the lockout components are in nested engagement, but not when the lockout components are in non-nested engagement.

Figure 25:
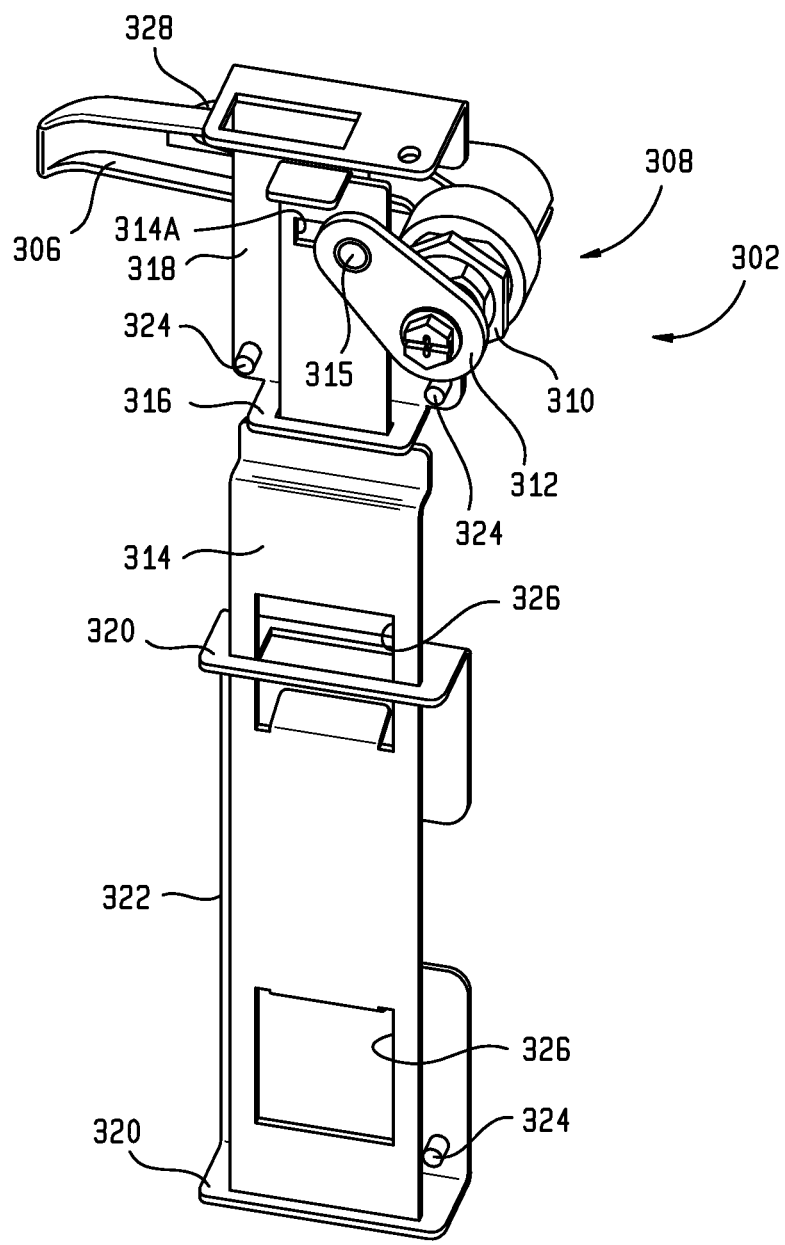
FIG. 25 is a perspective view showing an alternative power cutoff switch mechanism for an alternative main power breaker arrangement.

Turning now to FIG. 25, the power switch mechanism 302 is operable from outside a service entrance door (not shown) to mechanically engage and deactivate a main power breaker toggle switch (described below in connection with FIG. 26) and cutoff main power without having to open the service entrance door. Like the power switch mechanism 3 of the previous embodiments, the power cutoff switch mechanism 302 includes a handle 306 that extends from the outer end of a rotatable hub assembly 308. A central portion of the hub assembly 308 extends through an aperture (not shown) in the service entrance door and is secured thereto using a conventional backing nut 310. The inner end of the hub assembly 308 mounts a crank arm 312. The free end of the crank arm 312 is coupled to a slidable switch bar 314 by way of a cam follower pin 315 that operatively engages a cam slot 314A (providing a cam surface) on the switch bar. This arrangement serves to linearly drive the switch bar 314 when the handle 306, the hub assembly 308 and the crank arm 312 are rotated.

The switch bar 314 is slidably mounted to the inside surface of the service entrance door using an upper mounting bracket 316 formed on a base member 318 and a pair of lower mounting brackets 320 formed on a common base member 322. The base members 318 and 322 can be riveted or otherwise attached to the entrance door using rivets or other types of fasteners 324 (not all of which are shown). Each mounting bracket 316 and 320 is formed with a slot in which the switch bar 314 is slidably disposed. The switch bar 314 includes a pair of slot apertures 326. The switch bar 314 represents an embodiment of a first lockout component and the slot apertures 326 represent an embodiment of a first lockout component recess. If desired, the handle 140 may be provided with a conventional lock clasp 328 for securing the handle in a power-on position. The operation of the lock clasp 328 is the same as that of the lock clasp 160 described above in connection with FIGS. 14-16.

Figure 26:
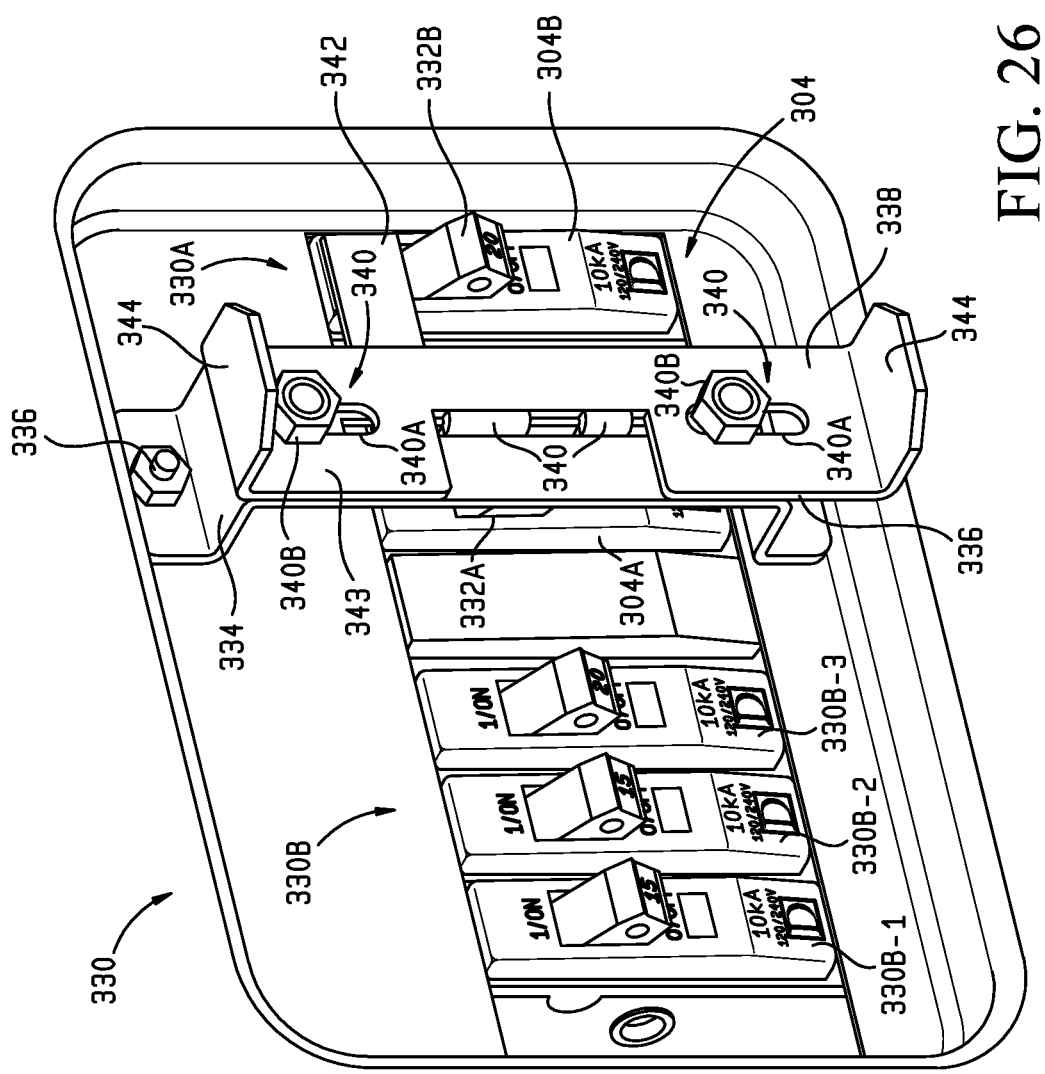
FIG. 26 is a perspective view showing an alternative main power breaker arrangement and an alternative main breaker position indicator.

Turning now to FIG. 26, the main power breaker 304 is part of a dual-function service panel 330 that comprises both a primary service panel 330A configured to receive power from a main power source, and a distribution service panel 330B operable to receive main power from the primary service panel and distribute such power to one or more subsidiary load circuits (not shown). The primary service panel 330A includes the main power breaker 304, which may actually comprise a pair of main power breaker units 304A and 304B that each has a respective main power breaker toggle switch 332A and 332B. It will be appreciated that this configuration is optional and that the main power breaker 304 could comprise only a single main power breaker unit if desired. The distribution panel 330B includes three circuit breakers 330B-1, 330B-2 and 330B-3. Additional circuit breakers could be added if desired.

A mounting bracket 334 is bolted or otherwise attached to the service panel 330 using bolts or other types of fasteners 336. Attached to the mounting bracket 334 is a main breaker position indicator 338. The main breaker position indicator 338 is slideably mounted for vertical movement on the mounting bracket 334 using a bolt-and-slot arrangement 340. In this bolt-and-slot arrangement, the main breaker position indicator 338 is provided with a pair of vertical slots 340A that slide up and down on a pair of bolts or other fasteners 340B mounted to the mounting bracket 334. The main breaker position indicator 338 also includes main breaker actuation components that actuate one or both of the main power breaker units 304A and 304B. To operate the main power breaker unit 304A, the main breaker actuation structure may utilize a pair of upper and lower actuating tabs 340 that respectively engage the upper and lower sides of the main power breaker toggle switch 332A. Up and down movement of the main breaker position indicator 338 will manipulate the main power breaker toggle switch 332A so that the main power breaker unit 304A is transitioned between its power-on state and its power-off state. To operate the main power breaker unit 304B, the main breaker actuation structure may utilize a lateral actuating lever 342 that engages the upper side of the main power breaker toggle switch 332B. Downward movement of the main breaker position indicator 338 will manipulate the main power breaker toggle switch 332B so that the main power breaker unit 304A is transitioned between from its power-on state to its power-off state. Up and down movement of the main breaker position indicator 308 is provided by the switch bar 314 of the power cutoff switch mechanism 302 as the handle 306 is actuated from the front of the service entrance door. The manner in which the switch bar 314 engages the main breaker position indicator 338 will now be described.

Figures 27A, 27B:
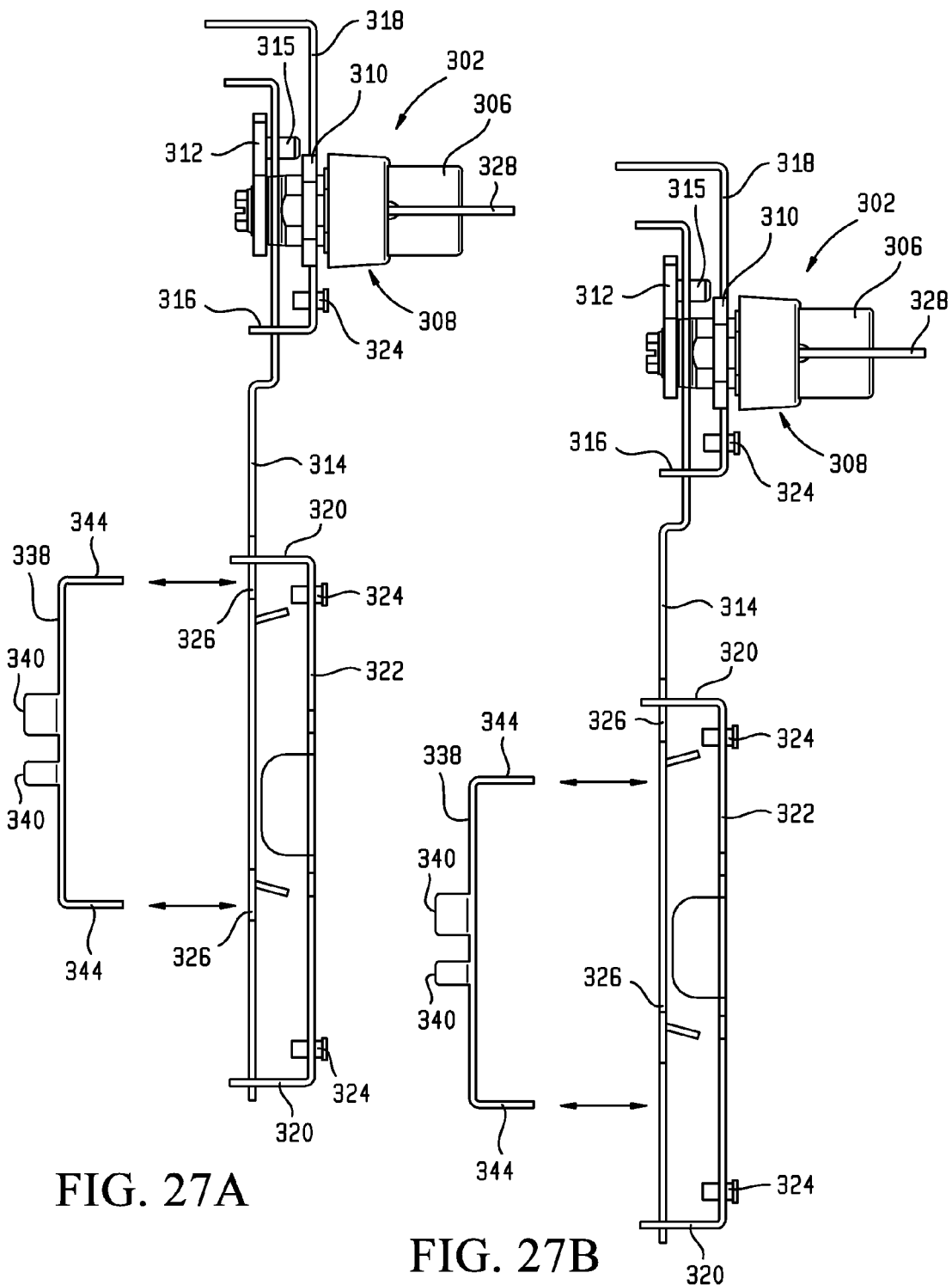
FIG. 27A is a perspective view showing an aligned position of the alternative power cutoff switch mechanism and the alternative main breaker position indicator of FIGS. 25-26.
FIG. 27B is a perspective view showing an offset position of the alternative power cutoff switch mechanism and the alternative main breaker position indicator of FIGS. 25-26.

The main breaker position indicator 338 may be formed with a generally flat main body portion 343 having a pair of outwardly extending rigid flanges 344 at each end. The main breaker position indicator 338 represents an embodiment of a second lockout component and the flanges 344 represent an embodiment of a second lockout component protrusion. The flanges 344 are located and sized to engage the slot apertures 326 of the power cutoff switch mechanism's switch bar 314 in nested engagement when the switch bar is properly aligned with the main breaker position indicator 338. This alignment position is shown in FIG. 27A. In this figure, the power cutoff switch mechanism 302 is in a position that represents its power-on state and the main breaker position indicator 338 is in a position that represents the power-on state of the main power breaker 304. Although not shown, proper alignment between the slidable switch bar 314 and the main breaker position indicator 338 will also be achieved when the power cutoff switch mechanism 302 and the main power breaker 304 are both in the power-off state. It will be appreciated that the nested engagement between the main breaker position indicator 338 and the switch bar 314 allows the latter to actuate the former and thereby operate the main power breaker 304.

If the slidable switch bar 314 and the main breaker position indicator 338 are not aligned, the flanges 344 will not engage the slot apertures 326 and will instead hit against a non-apertured portion of the switch bar 314. This non-aligned or offset position is shown in FIG. 27B. In this figure, the power cutoff switch mechanism 303 is in a position that represents its power-on state and the main breaker position indicator 338 is in a position that represents the power-off state of the main power breaker 304. Although not shown, misalignment between the slidable switch bar 314 and the main breaker position indicator 338 will also result when the power cutoff switch mechanism 304 is in the power-off state and the main power breaker 304 is in the power-on state.

Proper engagement of the flanges 344 of the main breaker position indicator 338 into the slot apertures 326 of the switch bar 314 is required in order to close and latch the service entrance door on which the power cutoff switch mechanism 302 is mounted, and also to allow the power cutoff switch mechanism to operate the main power breaker 304. If there is misalignment, the height of the flanges 344 is such that the service entrance door will not be fully closable when the flanges hit against the non-apertured portion of the switch bar 314.

Accordingly, an electrical panelboard enclosure has been disclosed. Although various embodiments have been described, it should be apparent that many variations and alternative embodiments could be implemented in accordance with the inventive concepts disclosed herein. For example, although various embodiments of a lockout system have been disclosed, it will be appreciated that other lockout system designs could also be implemented based on the teachings herein. Moreover, such lockout systems could be used with different types of panelboard enclosures that may differ from the example panelboard enclosures disclosed herein. It is understood, therefore, that the invention is not to be in any way limited except in accordance with the spirit of the appended claims and their equivalents.

What is claimed is:

1. An electrical panelboard enclosure, comprising:
   an enclosure housing having an interior equipment chamber accessible via an opening in said housing;
   a service entrance door mounted on said housing and positionable between a closed position wherein said opening is covered and an open position wherein said opening is exposed;
   a service panel in said equipment chamber configured to receive main power from a main power source;
   a main power breaker in said equipment chamber having a main power breaker toggle operable to selectively activate and deactivate said main power, said main power breaker being positionable between a power-on state and a power-off state;
   a power cutoff switch mechanism operable from outside said service entrance door to mechanically engage and deactivate said main power breaker toggle and cutoff said main power without opening said service entrance door, said power cutoff switch mechanism being positionable between a power-on state and a power-off state;
   a lockout system comprising a first lockout component movably mounted on an inside of said service entrance door as part of said power cutoff switch mechanism, and a second lockout component movably mounted on said service panel to actuate said main power breaker toggle;
   said first lockout component being arranged to engage said second lockout component as said service entrance door is being closed; and said lockout system being operable to prevent said service entrance door from being secured in said closed position unless said main power breaker and said power cutoff switch mechanism are in the same state and said first lockout component is aligned with said second lockout component as said service entrance door is being closed, and if said main power breaker and said power cutoff switch mechanism are not in said same state as said service entrance door is being closed, said first lockout component will be in misalignment with and hit against said second lockout component such that said service entrance door will not be fully closable when said first lockout component hits against said second lockout component.

2. The panelboard enclosure of claim 1, wherein said first lockout component and said second lockout component are configured for nested engagement with each other when said main power breaker and said power cutoff switch mechanism are in said same state, and are configured for non-nested engagement with each other when said main power breaker and said power cutoff switch mechanism are not in said same state.

3. The panelboard enclosure of claim 2, wherein one of said first lockout component and said second lockout component comprises a protrusion and the other of said first lockout component and said second lockout component comprises a recess.

4. The panelboard enclosure of claim 3 wherein said protrusion engages said recess when said first lockout component and said second lockout component are in said nested engagement, and wherein said protrusion does not engage said recess when said first lockout component and said second lockout component are in said non-nested engagement.

5. The panelboard enclosure of claim 4, wherein said first lockout component comprises a slidable switch bar formed with a cross bar that provides said protrusion, and wherein said second lockout component comprises a slidable main breaker position indicator formed as a channel having a pair of rigid sidewalls with mutually aligned notches that provide said recess.

6. The panelboard enclosure of claim 5, wherein said cross bar engages said notches when said first lockout component and said second lockout component are in said nested engagement, and wherein said cross bar engages said rigid sidewalls when said first lockout component and said second lockout component are in said non-nested engagement.

7. The panelboard enclosure of claim 4, wherein said first lockout component comprises a slidable switch bar formed with an aperture that provides said recess, and wherein said second lockout component comprises a slidable main breaker position indicator formed with a flange that engages said recess.

8. The panelboard enclosure of claim 7, wherein said flange engages said aperture when said first lockout component and said second lockout component are in said nested engagement, and wherein said flange engages a body portion of said slidable switch bar when said first lockout component and said second lockout component are in said non-nested engagement.

9. An electrical panelboard enclosure, comprising:
an enclosure housing having a front, a back, first and second sides, a top, a bottom, an opening in said front, and an interior equipment chamber accessible via said front opening;
a service entrance door pivotally mounted on said housing and positionable between a closed position wherein said front opening is covered and an open position wherein said front opening is exposed;
a primary service panel in said equipment chamber configured to receive power from a main power source and an alternate power source;
a main power source wireway in said equipment chamber arranged for routing main power source wiring to deliver main power from said main power source to said primary service panel;
an alternate power source connector array in said equipment chamber accessible from outside said enclosure housing and configured to detachably connect to alternate power source cables;
an alternate power source wireway in said equipment chamber arranged for routing alternate power source wiring;
alternate power source wiring disposed in said alternate power source wireway and interconnecting said alternate power source connector array and said primary service panel;
a distribution service panel in said equipment chamber operable to selectively receive said main or alternate power from said primary service panel and distribute said power to one or more subsidiary load circuits;
a service transfer switch unit associated with said primary service panel, said service transfer switch unit being operable to selectively delivery said main power and said alternate power to said distribution service panel;
a main power breaker in said service transfer switch unit having a main power breaker toggle operable to position said main power breaker between a power-on state and a power-off state to selectively activate and deactivate said main power to said distribution service panel;
an alternate power breaker in said service transfer switch unit having an alternate power breaker toggle operable to selectively activate and deactivate said alternate power to said distribution service panel;
an interlock in said service transfer switch operable to prevent simultaneous activation or deactivation of both said main power breaker toggle and said alternate power breaker toggle;
a power cutoff switch mechanism operable from outside said service entrance door to mechanically engage and deactivate said main power breaker toggle and cutoff said main power without opening said service entrance door, said power cutoff switch mechanism being positionable between a power-on state and a power-off state;
a lockout system comprising a first lockout component movably mounted on an inside of said service entrance door as part of said power cutoff switch mechanism, and a second lockout component movably mounted on said service panel to actuate said main power breaker toggle;
said first lockout component being arranged to engage said second lockout component as said service entrance door is being closed; and
said lockout system being operable to prevent said service entrance door from being secured in said closed position unless said main power breaker and said power cutoff switch mechanism are in the same state and said first lockout component is aligned with said second lockout component as said service entrance door is being closed, and if said main power breaker and said power cutoff switch mechanism are not in said same state as said service entrance door is being closed, said first lockout component will be in misalignment with and hit against said second lockout component such that said service entrance door will not be fully closable when said first lockout component hits against said second lockout component.

10. The panelboard enclosure of claim 9, wherein said first lockout component and said second lockout component are configured for nested engagement with each other when said main power breaker and said power cutoff switch mechanism are in said same state, and are configured for non-nested engagement with each other when said main power breaker and said power cutoff switch mechanism are not in said same state.

11. The panelboard enclosure of claim 10, wherein one of said first lockout component and said second lockout component comprises a protrusion and the other of said first lockout component and said second lockout component comprises a recess.

12. The panelboard enclosure of claim 11 wherein said protrusion engages said recess when said first lockout component and said second lockout component are in said nested engagement, and wherein said protrusion does not engage said recess when said first lockout component and said second lockout component are in said non-nested engagement.

13. The panelboard enclosure of claim 12, wherein said first lockout component comprises a slidable switch bar formed with a cross bar that provides said protrusion, and wherein said second lockout component comprises a slidable main breaker position indicator formed as a channel having a pair of rigid sidewalls with mutually aligned notches that provide said recess.

14. The panelboard enclosure of claim 13, wherein said cross bar engages said notches when said first lockout component and said second lockout component are in said nested engagement, and wherein said cross bar engages said rigid sidewalls when said first lockout component and said second lockout component are in said non-nested engagement.

15. The panelboard enclosure of claim 12, wherein said first lockout component comprises a slidable switch bar formed with an aperture that provides said recess, and wherein said second lockout component comprises a slidable main breaker position indicator formed with a flange that engages said recess.

16. The panelboard enclosure of claim 15, wherein said flange engages said aperture when said first lockout component and said second lockout component are in said nested engagement, and wherein said flange engages a body portion of said slidable switch bar when said first lockout component and said second lockout component are in said non-nested engagement.

17. A method of using a panelboard enclosure, said panelboard enclosure comprising:
an enclosure housing having an interior equipment chamber accessible via an opening in said housing;
a service entrance door mounted on said housing and positionable between a closed position wherein said opening is covered and an open position wherein said opening is exposed;
a service panel in said equipment chamber configured to receive power from a main power source;
a main power breaker in said equipment chamber having a main power breaker toggle operable to selectively activate and deactivate said main power, said main power breaker being positionable between a power-on state and a power-off state;
a power cutoff switch mechanism operable from outside said service entrance door to mechanically engage and deactivate said main power breaker toggle and cutoff said main power without opening said service entrance door, said power cutoff switch mechanism being positionable between a power-on state and a power-off state;
a lockout system comprising a first lockout component movably mounted on an inside of said service entrance door as part of said power cutoff switch mechanism, and a second lockout component movably mounted on said service panel to actuate said main power breaker toggle;
said first lockout component being arranged to engage said second lockout component as said service entrance door is being closed; and
said lockout system being operable to prevent said service entrance door from being secured in said closed position unless said main power breaker and said power cutoff switch mechanism are in the same state and said first lockout component is aligned with said second lockout component as said service entrance door is being closed, and if said main power breaker and said power cutoff switch mechanism are not in said same state as said service entrance door is being closed, said first lockout component will be in misalignment with and hit against said second lockout component such that said service entrance door will not be fully closable when said first lockout component hits against said second lockout component;
said method comprising:
opening said service entrance door;
if said main power breaker is in said power-off state, actuating said main power breaker to its power-on state;
initiating closure of said service entrance door;
if said first lockout component hits against said second lockout component to prevent said service entrance door from being fully closed due to said misalignment, actuating said power cutoff switch mechanism to its power-on state;
if said first and second lockout component are aligned, closing and securing said service entrance door so that said power cutoff switch mechanism engages said main power breaker toggle to allow said power cutoff switch mechanism to deactivate said main power breaker.

* * * * *